United States Patent [19]
Takagi et al.

[11] Patent Number: 6,089,695
[45] Date of Patent: *Jul. 18, 2000

[54] RECORDING APPARATUS FOR PERFORMING COMPLEMENTARY RECORDING AND RECORDING METHOD THEREFOR

[75] Inventors: Eiichi Takagi, Yokohama; Hiroyuki Miyake, Kawasaki, both of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/504,578

[22] Filed: Jul. 20, 1995

[30] Foreign Application Priority Data

Jul. 21, 1994 [JP] Japan .................................. 6-169434

[51] Int. Cl.⁷ .............................. B41J 2/21; B41J 2/205; B41J 2/145; B41J 2/15

[52] U.S. Cl. .................................. 347/40; 347/15; 347/43

[58] Field of Search ................................ 347/43, 15, 40, 347/41, 19

[56] References Cited

U.S. PATENT DOCUMENTS

| | | |
|---|---|---|
| 4,313,124 | 1/1982 | Hara . |
| 4,345,262 | 8/1982 | Shirato et al. . |
| 4,459,600 | 7/1984 | Sato et al. . |
| 4,463,359 | 7/1984 | Ayata et al. . |
| 4,521,123 | 6/1985 | Boehmer . |
| 4,558,333 | 12/1985 | Sugitani et al. . |
| 4,608,577 | 8/1986 | Hori . |
| 4,723,129 | 2/1988 | Endo et al. . |
| 4,740,796 | 4/1988 | Endo et al. . |
| 4,907,013 | 3/1990 | Hubbard et al. ........................... 347/19 |
| 4,963,882 | 10/1990 | Hickman ................................. 347/43 |
| 5,124,720 | 6/1992 | Schantz . |
| 5,430,469 | 7/1995 | Shioya et al. ............................. 347/15 |

FOREIGN PATENT DOCUMENTS

| | | |
|---|---|---|
| 0378759 | 7/1990 | European Pat. Off. . |
| 0559370 | 9/1993 | European Pat. Off. . |
| 0568283 | 11/1993 | European Pat. Off. . |
| 54-056847 | 5/1979 | Japan . |
| 59-123670 | 7/1984 | Japan . |
| 59-138461 | 8/1984 | Japan . |
| 60-071260 | 4/1985 | Japan . |

(List continued on next page.)

OTHER PUBLICATIONS

B. Kockler, "Ink Jet Printer Stitching Improvement", vol. 4, No. 2, pp. 249–250, Xerox Disclosure Journal, Mar./Apr. 1979.

Primary Examiner—N. Le
Assistant Examiner—Thinh Nguyen
Attorney, Agent, or Firm—Fitzpatrick, Cella, Harper & Scinto

[57] ABSTRACT

A recording apparatus is to perform complementary recording in order to eliminate the white streak caused by recording elements becoming incapable of recording while recording an image. Particularly, in an ink jet recording method for recording an image by discharging ink from nozzles, the white streak caused by nozzles becoming incapable of discharging ink can be eliminated by the performance of a complementary, recording in accordance with the present invention.

Preceding printing, abnormal nozzles are detected, and then, data related to such abnormal nozzles are removed. In accordance with such data, one scan printing is performed. Preceding the returning operation of the printing head subsequent to the one scan, a sub-scanning feed is performed so that normal nozzles are positioned in a location corresponding to the white streak appearing in the one scan printing. In this way, while returning the printing head, the printing is performed in accordance with such data related to the abnormal nozzles detected at the time of one scan, hence executing a complementary recording appropriately.

22 Claims, 14 Drawing Sheets

FOREIGN PATENT DOCUMENTS

| | | |
|---|---|---|
| 61-123545 | 6/1986 | Japan . |
| 62-053492 | 3/1987 | Japan . |
| 63-254050 | 10/1988 | Japan . |
| 3046589 | 7/1991 | Japan . |
| 5301427 | 11/1993 | Japan . |
| 6079956 | 3/1994 | Japan . |
| WO93-04443 | 3/1993 | WIPO . |

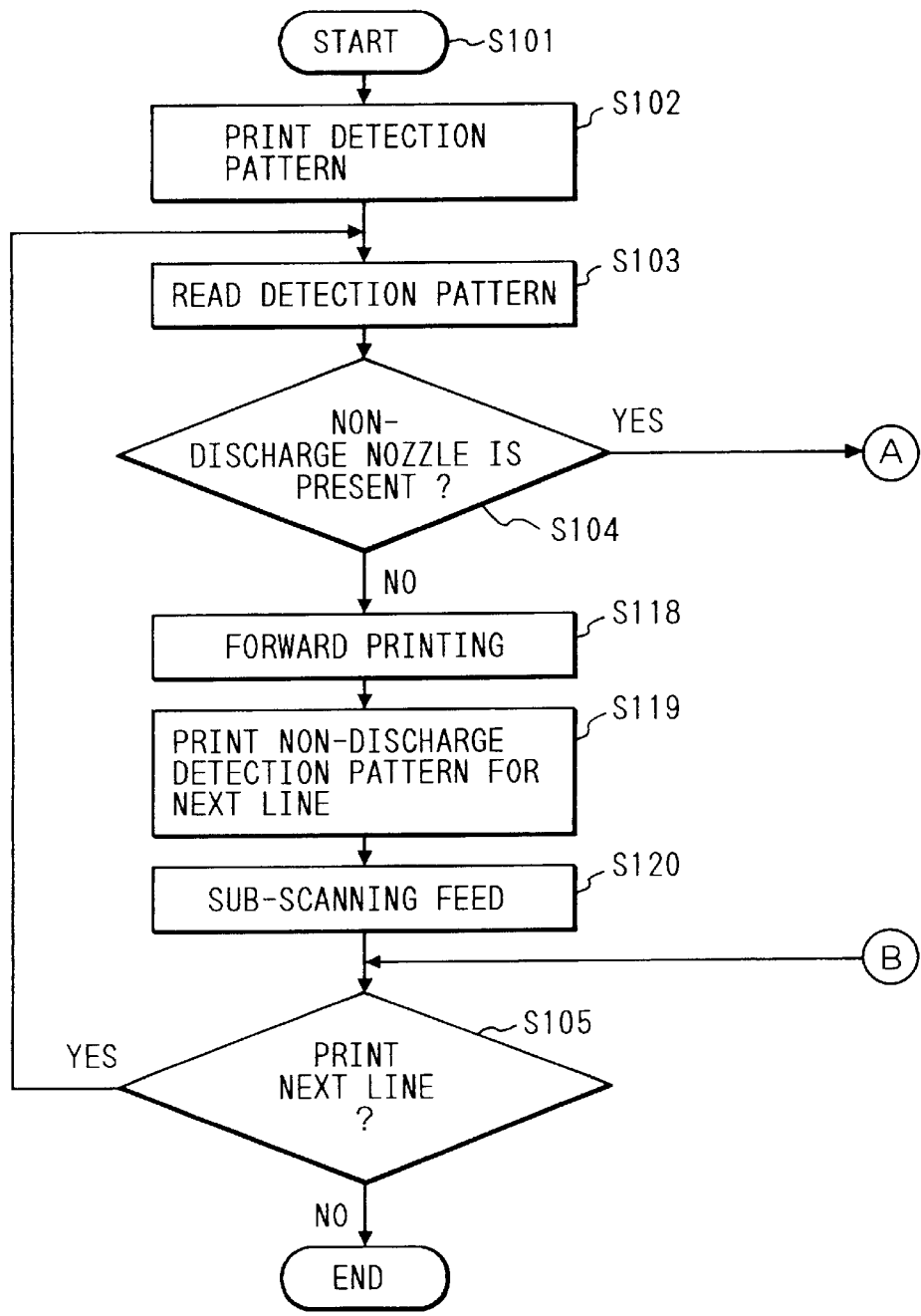

RECORDING APPARATUS FOR PERFORMING COMPLEMENTARY RECORDING AND RECORDING METHOD THEREFOR

BACKGROUND OF THE INVENTION

1. Field of the Invention

The present invention relates to an ink jet recording apparatus using a liquid discharging head to discharge ink or other liquid. More precisely, the invention relates to a printing apparatus for making given prints on a recording medium such as paper, cloth, nonwoven cloth, or OHP sheet.

Particularly, the present invention is to provide a printing apparatus capable of executing a continuous printing for a long time or a printing apparatus effectively applicable to making prints continuously on a cloth as wide as more than one meter. More specifically, there are named a printer, copying machine, ink jet printing apparatus, facsimile apparatus, or other office equipment, and a textile printing apparatus or other large industrial equipment as those to which the present invention is applicable.

2. Related Background Art

As the conventional liquid discharging apparatuses, there are those which discharge ink droplets onto a recording medium to obtain images or those which discharge special liquid for the utilization thereof. An ink jet recording apparatus is to discharge ink droplets onto a recording medium to form images. Unlike electronic photography or others, it uses a lesser number of devices or equipment that may be required before the formation of images. As a result, there is a significant advantage that the ink jet recording apparatuses are capable of forming intended images more stably.

In general, however, a discharge unit for discharging liquid is structured extremely fine. Therefore, defective discharges tend to occur due to solidification of dyes or pigments mixed in a liquid or due to adhesion of foreign particles, hence creating a problem that a liquid discharging apparatus such as an ink jet recording apparatus may present defective recording in some cases. In order to avoid the occurrence of a problem of this kind, it is practiced at appropriate intervals that liquid is forcibly exhausted by means of suction, compression, or the like known as recovery means; the discharging area of the discharge unit is cleaned; or gas or fluid is ejected onto the discharging area of the discharge unit.

Meanwhile, for use of an ink jet recording apparatus, it is desired to execute recording in a higher quality and resolution in consideration of its nature as an excellent recording apparatus. Therefore, its image formation is performed by use of finer nozzles. The use of finer nozzles often results in the creation of the problems described above, which leads to the unstable recording, and degradation of the quality of recorded images. Included among the causes in this respect are, twisted recording brought by the unstable discharging direction of ink with minute displacement of impacting positions of ink droplets; non-discharges due to clogging of discharge ports (nozzles) by adhesion or mixture of dust particles or overly viscous ink; non-discharge due to heater wiring breakdown in the bubble jet method in which air bubbles are created in ink by use of electrothermal transducing elements (heaters) to discharge ink; and also, non-discharge due to the adhesion of ink droplets to the discharge port surface to cover the discharge ports.

Because of such non-discharge of the kind, the lines that are not recorded appear as white streaks in a recorded image along the scanning direction of a serial printer, hence degrading the quality of the recorded image significantly.

This kind of problem is more often encountered when the number of nozzles is increased to several hundreds or thousands in anticipation of the enhanced printing throughput. Proportionally to this attempt, the probability that abnormal nozzles occur is inevitably increased to make it more difficult to obtain perfect images.

Also, from the viewpoint of head fabrication, it has been required to provide all the nozzles in a normal condition without any defects. However, when the number of nozzles is increased as described above, the probability rate of defective nozzles is proportionally increased in the head's manufacture. The yield rate is thus decreased making it difficult to reduce its market price ultimately.

Also, in the conventional art, even if the perfect nozzles are used, the head becomes unusable when a malfunction takes place with just one nozzle of the many ones while in recording. Therefore, a printing apparatus provided with a multinozzle head having six to eight nozzles each often encounters abnormal nozzles, and produces defective prints whenever such condition is encountered. Furthermore, whenever an abnormal nozzle occurs, heads should be replaced, hence not only presenting the problem of costs, but also, idling the apparatus because of the inevitable suspension of its operation.

Also, not necessarily in recording by use of the ink jet recording method, when a recording element becomes unable to record due to its damages or the like brought to a recording apparatus which forms images on a recording medium by use of various recording elements, it should eventually continue recording in a state that part of recording dots is missing in an image being recorded, or suspend the recording temporarily for the replacement of recording heads, and restore the state so that the apparatus is able to record again.

As an invention to solve the problems described above, the applicant hereof has disclosed in Japanese Patent Laid-Open Application No. 6-79956 a method whereby to execute a complementary recording in the recording position of a nozzle where non-discharge has taken place. According to this disclosure, a serial scan is performed by use of a multinozzle head, while a given area is divided into portions for several scans, so that the method is comparable to that of recording by executing multiple scans. In this method, each recording is executed complementarily. In a recording position of the nozzle whose discharging has become incapable, a printing is performed by another scan to complement this condition; hence preventing the image quality from being degraded by any possible non-discharges.

There is also disclosed in Japanese Patent Laid-Open Application No. 6-79956 a recording structure to complement non-discharge nozzles with a separately arranged head with respect to image data unable to be recorded by the nozzles caused to malfunction due to non-discharge.

As described above, the invention proposed in the Japanese Patent Laid-Open Application No. 6-79956 is to attain printing by complementing non-discharge nozzles in order to reduce image defects (white streaks and twisting) caused by abnormal nozzles such as those presenting non-discharge. However, by use of the multiscan method disclosed in the application described above, the nozzles for the execution of the complementary recording are to print overlapping data. Therefore, the speed of such complementary printing should be switched to agree with the speed that allows the overlapped data to be printed. Here, the printing speed of the multiscan method should be reduced to almost a half because this method is to execute sub-scans per half a recordable width. In practice, assuming that malfunction such as non-discharge takes place with respect to some of the nozzles, not all the nozzles being in such unfavorable condition, there is essentially no alternative for this proposed method but to reduce the printing speed of the recording apparatus.

Also, in the application described above, a recording structure is disclosed to complement non-discharge nozzles by use of a head separately arranged for dedicated use of the image data related to the nozzles affected by non-discharges. In accordance with this structure, it is possible to print without reducing the printing speed. However, a head should be provided for the dedicated use of such complementary operation, which is needed only as far as a malfunction of nozzles, such as caused by non-discharges, takes place. Moreover, it is necessary to carry on additional maintenance of the discharging condition of the nozzles dedicated for the complementary use. Particularly when the number of nozzles is increased to effectuate a high-speed printing, the costs of the head become inevitably greater. Also, for a color printing apparatus, the heads dedicated for the complementary use should be arranged in accordance with the heads to be used for plural colors. Hence, not only the problem related to higher costs, but also the structural arrangement of the apparatus becomes still more complicated. There is also a significant problem that the apparatus itself should be made larger to provide this complementary arrangement.

Also, in accordance with Japanese Patent Laid-Open Application No. 5-301427, which is filed by the applicant hereof, the conditions immediately after printing are read by a sensor at the time of printing execution simultaneously in order to compute any difference in data to be printed; thus interpreting such differences caused by non-discharge if any obtained. The disclosed structure is arranged so that a complementary recording is executed by a proceeding scan subsequent to this computation or by a head separately arranged for complementary use to follow. Even with this structure, the problems described above have not been solved completely.

Also, in the specification of U.S. Pat. No. 5,124,720, a structure is disclosed for printing by use of only a group of heads, which does not include any non-discharge nozzles, when a non-discharging occurs. In accordance with this structure, printing is made by use of only a front half or rear half of the head without using the central part of it if non-discharge takes place in the central part of the head, for example. Therefore, if non-discharges occur in many positions, the usable portion of the head is reduced immediately. If this structure is adopted for a color printer, the usable portion of the printing heads is reduced extremely because non-discharges may be overlapped with the heads to be used for other colors. This presents a disadvantage that along with this reduction of usable part of heads, the printing speed drops down significantly.

SUMMARY OF THE INVENTION

With a view to solving the problems described above, the present invention is designed. It is an object of the invention to provide a liquid discharging apparatus capable of obtaining the desired result of discharges (recorded images) without any defects even when non-discharge or another malfunction occurs in the discharging means of a liquid discharging apparatus such as an ink jet recording apparatus.

It is another object of the present invention to achieve the complementary recording described above without reducing the throughput of the apparatus, and also, without making the apparatus itself more complicated and larger.

In consideration of the problems described above, a recording apparatus comprises a recording head formed by the arrangement of plural recording elements; main scanning means to execute the main scans of the recording head relatively with respect to a recording medium; recording head driving means to form images on the recording medium by driving the recording head while in scanning executed by the main scanning means of the recording head; and sub-scanning means to execute the sub-scan of the recording head with respect to the recording medium in the direction substantially perpendicular to the scanning direction of the main scanning means, and then, in accordance with the present invention, this apparatus is provided with complementary recording means to execute a sub-scan by sub-scanning means for an amount smaller than the length of the arrangement of recording elements of the recording head subsequent to the recording scan of the main scanning means, and to execute a complementary recording in the next main scan of the recording head by use of other recording elements with respect to the recording area corresponding to the recording elements that have become incapable of recording.

Also, in accordance with the present invention, a sub-scan is executed by a sub-scanning means for an amount smaller than the length of the arrangement of the recording elements of the recording head subsequent to the recording scan of the main scanning means, and then, a complementary recording is executed by other recording elements during the time of returning operation of the recording head in the main scan with respect to the recording area corresponding to the recording elements that have become incapable of recording.

Also, in accordance with the present invention, a recording method for a recording apparatus, which is provided with a recording head formed by the arrangement of plural recording elements; main scanning means to execute the main scans of the recording head relatively with respect to a recording medium; recording head driving means to form images on the recording medium by driving the recording head while in scanning executed by the main scanning means of the recording head; and sub-scanning means to execute the sub-scan of the recording head with respect to the recording medium in the direction substantially perpendicular to the scanning direction of the main scanning means, comprises a step of recording by putting aside the recording elements that have become incapable of recording among a plurality of recording elements at the time of main scans of the main scanning means; a step of sub-scanning to execute the sub-scan in an amount corresponding to the recording elements that have become incapable of recording; and a step of executing complementary recording by use of other recording elements in the position corresponding to the recording elements that have generated the malfunction.

In accordance with the ink jet recording apparatus of the present invention, which records by discharging ink from nozzles, a detection of abnormal nozzles is conducted before printing; the image data that has otherwise been added to the printing corresponding to abnormal nozzles is removed (or such image data are not removed if the malfunction is non-discharge), and then, the corresponding line is printed by the forward main scan of the carriage. In this recording, a white streak is created with respect to the nozzles disabled to print. Before the carriage returns after the completion of such line, a sub-scanning feed is executed for a slight amount. The data that was not printed by the forward printing is printed in the reversed order at the time of backward printing by making such data printable by the nozzles in good condition, thus the data now correspondingly related anew to such nozzles by means of the aforesaid slight sub-scan. In this way, the portion in which the white streak appears in the forward printing is printed complementarily. As a result it becomes possible to prevent defective images from being formed by the nozzles that have become incapable of recording because of non-discharge.

Also, the detection of abnormal nozzles is executed by reading dots recorded for a test print one by one. Since every one of the dots is detected, the sub-scanning feed for the aforesaid slight amount can be just for a small amount, (if the non-discharge nozzle is only one, the minimum sub-scanning feed is an amount equivalent to one nozzle portion). Therefore, the time required for the sub-scanning feed is extremely limited so that the complementary printing in the returning scan can be started immediately, thus the printing speed being scarcely reduced even when the complementary recording operation is involved.

Moreover, should several nozzles generate non-discharges, the probability is small to overlap non-discharging nozzles and the white streak created in the forward printing when the returning scan is performed after the aforesaid slight sub-scanning feed. As a result, it is possible to continue normal printing even by a head having non-discharge nozzles to a considerable extent.

Also, non-discharge (abnormal) nozzles can be detected by means of photosensing elements. It is possible to read out 2 to 32 nozzles as one unit. for example. In other words, this detection is possible in a precision of several pixels (comparatively rough precision), although it is difficult to determine which one of the nozzles presents the state of non-discharging in this case. It is still possible to substantially determine the position where non-discharge (abnormal) nozzles exist on the recording head. In accordance with this determination, the image data is removed with respect to the group of nozzles in the position of the non-discharge (abnormal) nozzles. Then, this line is printed by the forward scan of the carriage (thus creating the white streak in a width equivalent to that of the nozzles having become incapable of printing). A sub-scanning feed is performed for an amount more than the width of the white streak, and the image data is printed by the returning scan in the reverse order so that the portion left unprinted as the white streak and in the forward scan is complementarily printed. If the number of non-discharge nozzles is increased, the probability becomes higher than the group of nozzles having the non-discharge nozzles in the forward scan is still impossible to cover the white streak completely when the intended complementary printing is performed in the returning scan. However, it is possible to easily structure a highly reliable non-discharge detector, which is capable of conducting non-discharge detection in a short period of time for making decisions as required. In this way, not only the slowdown of recording speed is suppressed, but also, the non-discharge detector is materialized at low costs.

DETAILED DESCRIPTION OF THE PREFERRED EMBODIMENTS

Hereinafter, with reference to the accompanying drawings, the present invention will be described in detail.

Figure 14:
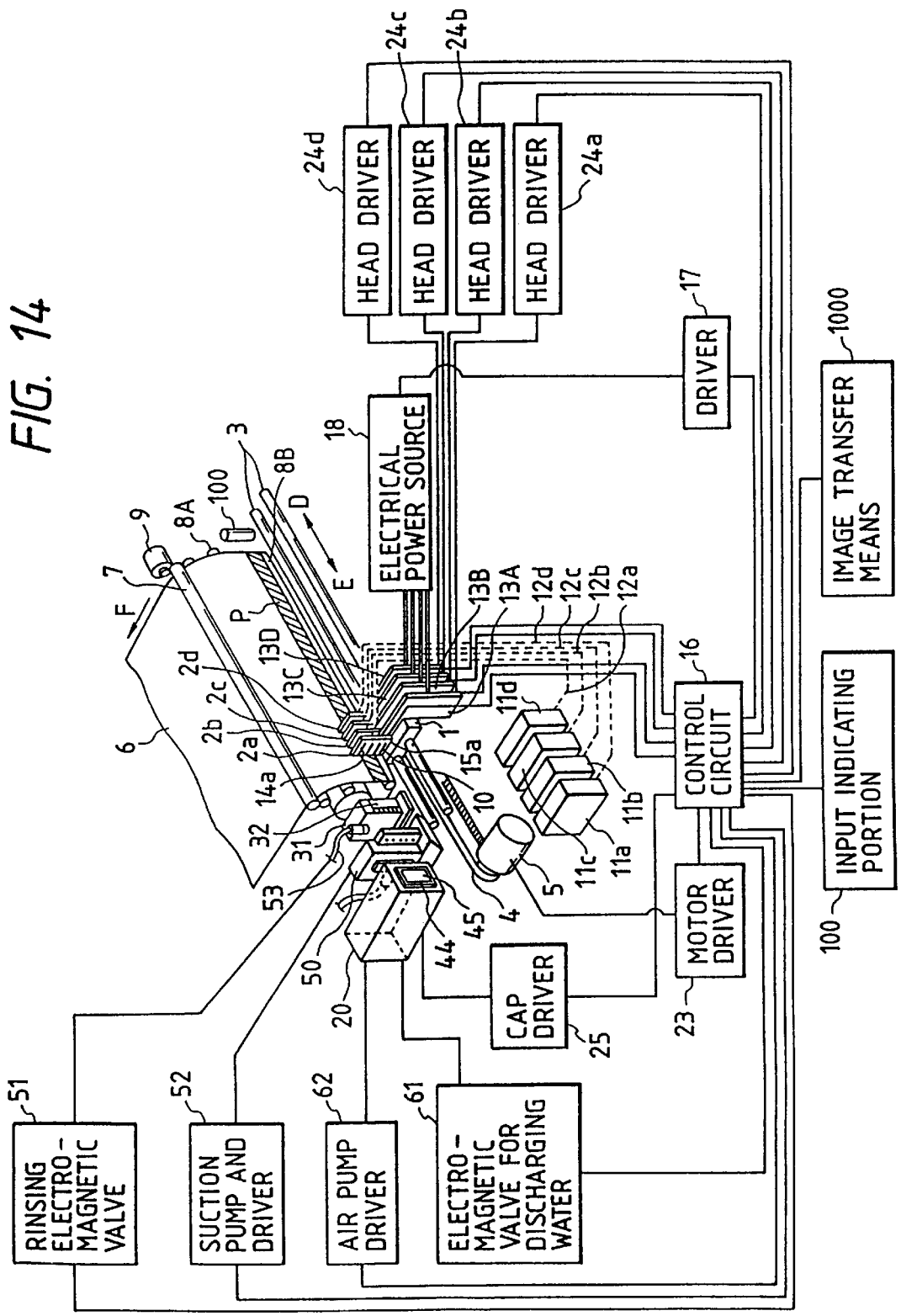
FIG. 14 is a view which shows the structure of a printing apparatus to which the present invention is applicable.

FIG. 14 shows a structural example of an ink jet printing apparatus serving as a liquid discharging apparatus to which the present invention is applicable.

In FIG. 14, a carriage 1 mounts on it printing heads 2a, 2b, 2c, and 2d for use of four colors, cyan, magenta, yellow, and black, respectively. Guide shafts 3 support and guide the carriage 1 movably. Reference numerals 22a, 22b, 22c, and 22d designate the respective discharge port surfaces of the printing heads.

A part of an endless belt 4 is connected to the carriage 1. The carriage 1 is driven by a driving motor 5, a pulse motor driven by a motor driver 23, through the belt 4, and travels on the guide shafts 3 along the printing surface of a paper, OHP film, cloth or other printing medium (hereinafter referred to as a printing sheet) 6. Further, there are provided a feed roller 7 to feed the printing sheet 6, guide rollers 8A and 8B to guide the printing sheet 6, and a feed motor 9 to feed the printing sheet.

Also, a liquid path 10 is provided for each of the printing heads 2a, 2b, 2c, and 2d to discharge ink droplets toward the printing sheet 6. To each ink path 10, ink is supplied from each of the ink tanks 11a, 11b, 11c, and 11d arranged for each of the printing heads 2a, 2b, 2c, and 2d through the supply tubes 12a, 12b, 12c, and 12d, respectively. To each of means (not shown) arranged for each of the liquid paths 10 to generate energy to be utilized for discharging ink, ink discharge signals are selectively applied from each of the head drives 24a, 24b, 24c, and 24d through flexible cables 13a, 13b, 13c, and 13d, respectively.

Further, for each of the printing heads 2a, 2b, 2c, and 2d, the head heaters 14a, 14b, 14c, and 14d (14b, 14c, and 14d are not shown in FIG. 14) and temperature detecting means 15a, 15b, 15c, and 15d (15b, 15c, and 15d are now shown in FIG. 14) are arranged, respectively. The detection signals from the temperature detecting means 15a, 15b, 15c, and 15d are inputted into a control circuit 16 provided with a CPU. The control circuit 16 controls the heating conditions of the head heaters 14a, 14b, 14c, and 14d through a power-supply 18 in accordance with these signals.

Capping means 20 abuts upon the discharge port surface of each of the printing heads 2a, 2b, 2c, and 2d at the time of no printing. When printing is out of operation, the printing heads 2a, 2b, 2c, and 2d travel to the position facing the capping means 20. At this juncture, the capping means 20 is driven by a cap driver 25 to advance forwardly so that its elastic member 44 is pressed to be in contact closely with the discharge port surfaces to complete capping.

When the printing head is left intact in the air for a long time, the moisture in ink is evaporated to make the ink overly viscous in the nozzles. As a result, discharging becomes unstable. In order to prevent this condition, the nozzle unit is cut off from the air and closed airtightly (being capped) when the nozzle unit is not in printing operation. In the cap unit, an absorbent is provided and kept in a moist condition by ink so as to minimize over viscosity of ink by maintaining the interior of the cap unit in high humidity.

Also, if the capping condition is left intact for a long time, recovery process is executed by exerting pressure on ink. In other words, if this condition is left intact for a long time, ink in the interior of the discharge ports is gradually evaporated even when capped, and it becomes overly viscous. Also, air bubbles may be caused to reside in the interior of the discharge ports, thus hindering stable discharge in some cases. Therefore, when starting a printing, a pump provided for the ink tank is driven to pressurize ink so as to exhaust the overly viscous ink and remaining air bubbles in the interior of the discharge ports to the outside of the discharge ports. In this way, even if dust particles and fluffs adhere to the discharge port surface or dust particles and others enter the interior of the discharge ports, it is possible to effectively rinse them out for the maintenance of stable discharging.

The means 31 for preventing clogging is to receive discharged ink when the printing heads 2a, 2b, 2c, and 2d operate idle discharging (that is, predischarging). This means 31 for preventing clogging faces the printing heads 2a, 2b, 2c, and 2d. It is provided with a member 32 to receive liquid serving as the liquid receptacle that absorbs idly discharged ink, and arranged between capping means 20 and the start position of printing. In this respect, spongy porous material, sintered plastic material, or the like is effectively used for the liquid receiving member 32 and liquid retaining member 45.

Also, the idle discharge is not aimed at printing itself, but is to effectuate the temperature assurance of the area whose temperature is lowered due to the discharging flows of fluid and gas, as well as to remove unwanted substances in the discharge ports. Also, beside them, the idle discharge provides given driving pulses before the start of printing, so that ink is discharged from the entire discharge ports toward the cap unit and the like (that is, to carry out an aging operation). Here, if necessary, an idle discharge is performed while in capping in order to enhance the wetting condition in the atmosphere surrounding the discharge ports.

To cleaning means 50, a rinsing electromagnetic valve 51 and a suction pump driver 52 are connected.

Under the control of a control circuit 16, rinsing solution is discharged from means 53 for wiping and rising, and rinsing solution is sucked from cleaning means 50, respectively.

Figure 15:
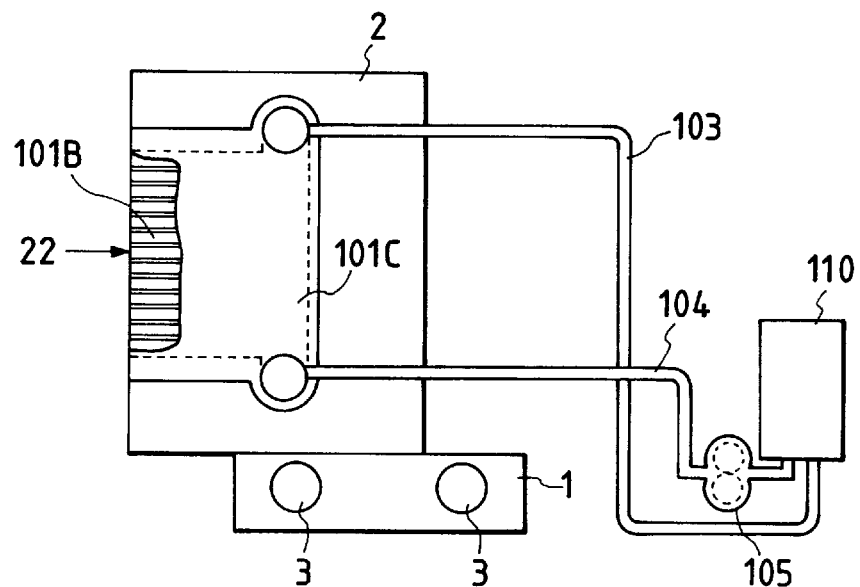
FIG. 15 is a view which schematically shows a structural example of a head and ink system.

FIG. 15 shows a structural example of a liquid discharge head. In FIG. 15, a reference numeral 2 designates the discharge head; 22, its discharge surface; 101B, a nozzle unit in which a plurality of liquid paths are arranged in parallel in the vertical direction, and also, elements for generating discharge energy, such as electrothermal transducing elements, are arranged; 101C, a common ink chamber to supply ink to each of the liquid paths, which is connected to an ink tank 110 through supply tubes 103 and 104. Then, for one of the supply tubes 104, a gear pump 105 is provided to press ink to flow in the ink supply system of the printing head 2 for the execution of ink exhaustion from the discharge ports or to execute an ink refreshing process (hereinafter referred to as a pressurized circulating process) by circulating ink in the ink supply tubes 103 and 104 through the ink chamber 101C when air bubbles and dust particles mixed in the supply paths and nozzle unit 101B are to be removed or any discharge recovery process is executed to remove the overly viscous ink or the like.

Figure 17:
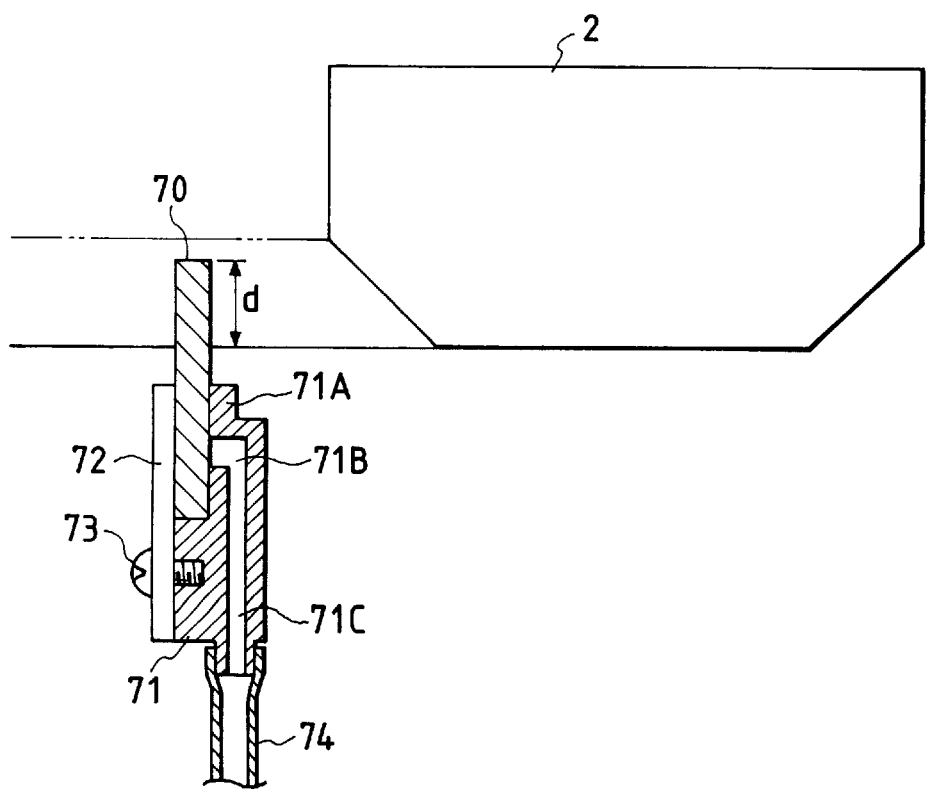
FIG. 17 is a view which shows a structural example of wiping means.
Figure 16:
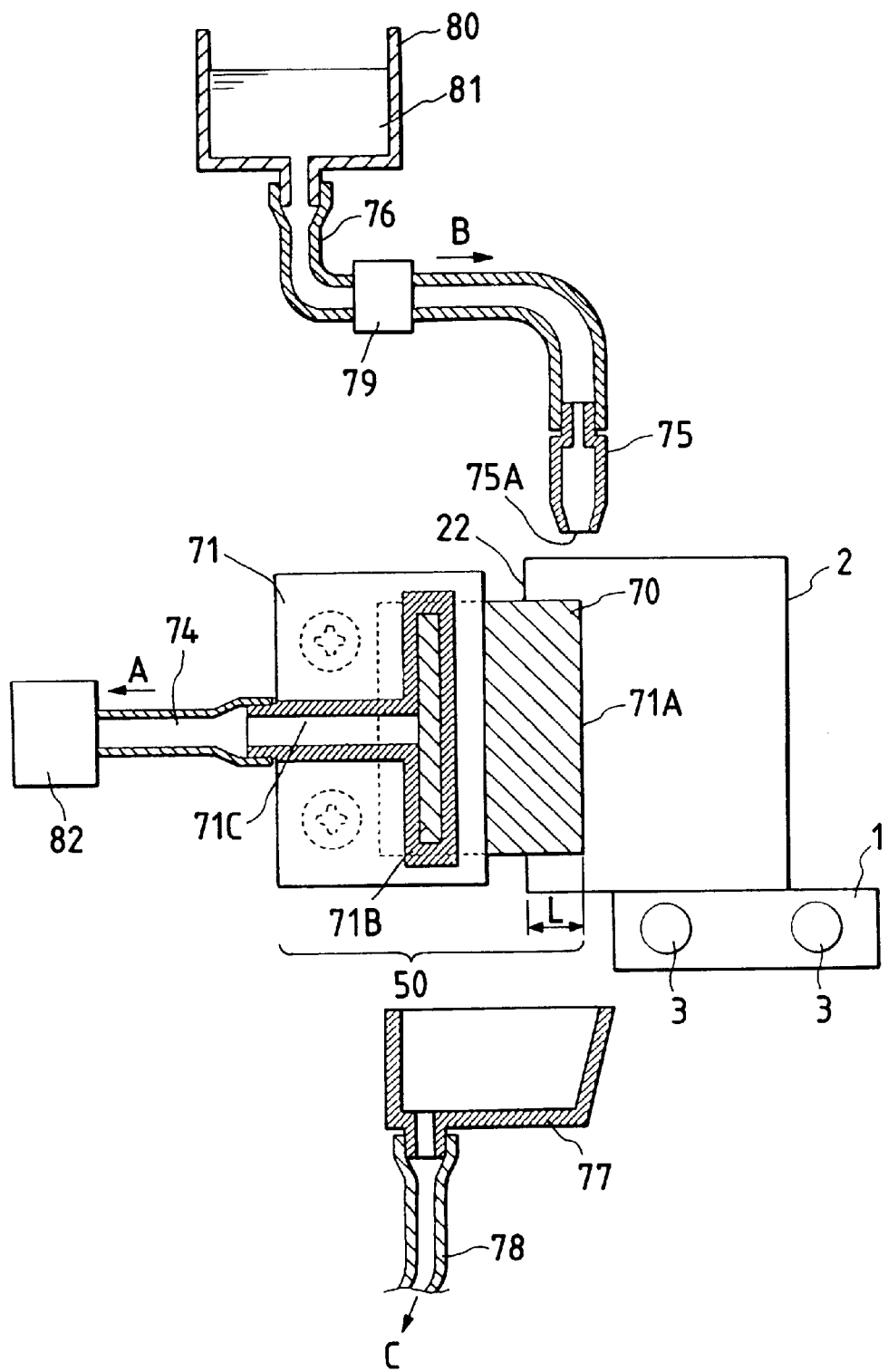
FIG. 16 is a view which schematically shows a structural example of recovery means in accordance with the present embodiment including wiping means and cleaning means.

FIG. 16 and FIG. 17 are views showing a structural example of cleaning means 50. Here, FIG. 16 is a view which illustrates the cleaning means 50 observed from the main scanning direction of the head 2. FIG. 17 is a view which illustrates a cleaning member 70 and the head 2, which are observed from above. In the present embodiment, the cleaning member 70 serving as wiping means is formed by a flexible porous element. As the material of the cleaning member, it is possible to use polymeric porous element. When a polymeric porous element is used therefor, it is preferable to use a kind that does not make changes in volume when it absorbs ink, and not one that changes its volume conspicuously when absorbing ink mist like a polymeric foaming element. For example, it may be possible to utilize an element formed by formal foam resin as a suitable element in this respect.

Also, as an ink absorbent to be used here, a thermally sintered type polymeric porous element can be utilized. For example, it may be able to cite a thermally sintered low concentration polyethylene, high concentration polyethylene, polymeric polyethylene, compound polyethylene, polypropylene, polymethyl methacrylate, polystyrene, acrylonitrile copolymer, ethylene vinyl acetate copolymer, fluororesin, phenolic resin, or the like. Of these elements, preference is given to those using low concentration polyethylene, high concentration polyethylene, polymeric polyethylene, or polypropylene in consideration of the required capability of absorption of and resistance to ink.

A reference numeral 71 designates a holder to fix the cleaning member 70 by pinching it with a fixing board 72, and 73, a fixing screw. On the holder 71, an aperture 71B is arranged on the surface 71A that abuts upon the cleaning member 71, and then, the structure is arranged to connect the holder and a suction tube 74 through a communicating path 71C so that rinsing solution and ink absorbed by the cleaning member 70 are exhausted by a suction means 82 in the direction indicated by an arrow A. This suction means 82 may be replaced by means for exhausting rinsing solution from the cleaning member with the formation of a path to exhaust fluid by connecting a porous member or fabric member to the cleaning member 70.

After rinsing by sucking the rinsing solution, the amount of rinsing solution remaining in the cleaning member 70 is reduced appropriately, thus restoring the capability to absorb ink, foreign particles, or the like. In this way, it is possible to enhance the cleaning effects of the discharge port surface of the head 2. Also, the leading end 70A of the cleaning member 70 is overlapped with the discharge surface 22 of the discharge head 2 by a length designated by the letter L. It is then arranged to wipe the discharge surface 22 of the head 2 by use of this overlapped portion when the head 2 scans.

A reference numeral 75 designates a nozzle for supplying rinsing solution. By means of opening or closing an electromagnetic valve 79, rinsing solution 81 is supplied from a tank 80 serving as means for supplying rinsing solution in the direction indicated by an arrow B through its supply tube 76. Thus the structure is arranged to supply the rinsing solution from the nozzle of the discharge unit 75A downwardly toward the cleaning member 70 for its cleaning operation.

A reference numeral 77 designates a receiving tray arranged below the cleaning member 70. The structure is arranged to use this tray to receive the rinsing solution, which is not absorbed by the cleaning member 70, but drops together with ink and foreign particles adhering to the cleaning member 70 as the rinsing solution is being supplied from the supply nozzle 75. A reference numeral 78 designates an exhaust tube to exhaust the rinsing solution received by the receiving tray 77 to an exhaust unit (not shown) in the direction indicated by an arrow C.

Figure 18:
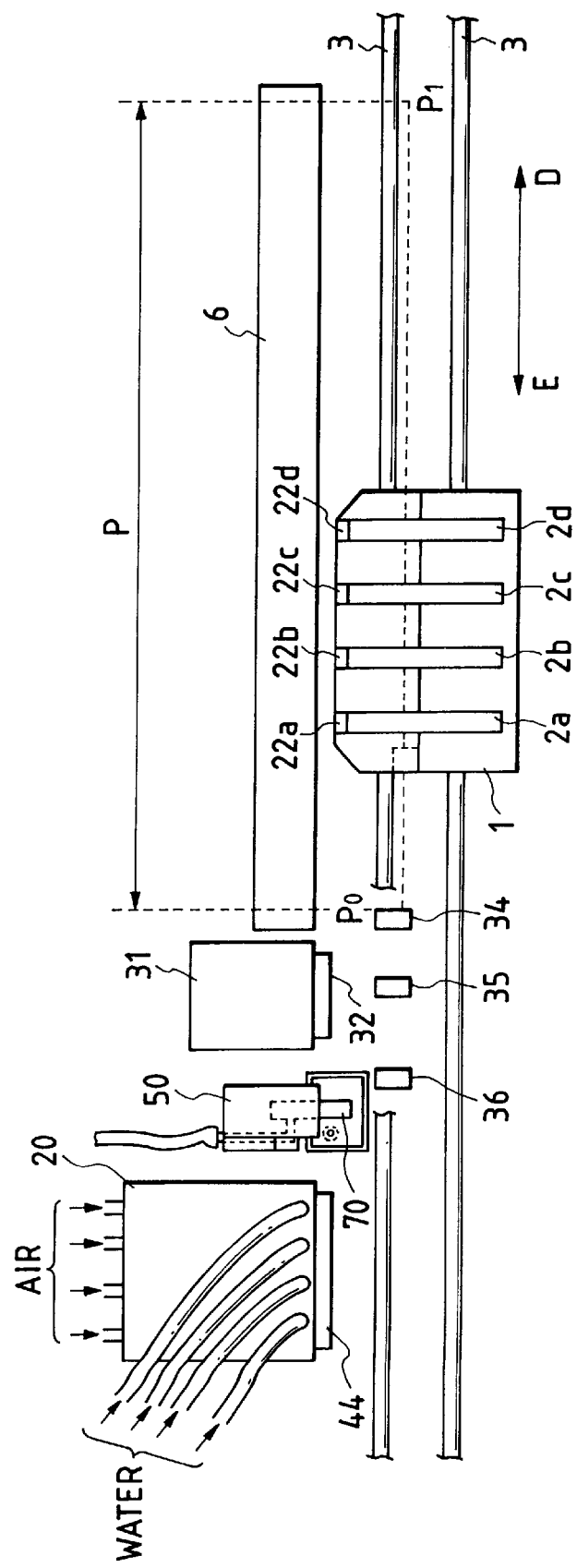
FIG. 18 is a plan view which schematically shows the structure of cleaning means in the vicinity of the home position of the recording head.

Now, the operation of the ink jet recording apparatus will be described hereunder. In FIG. 18, a printing start detection sensor 34 and a capping means detection sensor 36 detect that each of the printing heads 2a, 2b, 2c, and 2d is in the given capping position. A sensor 35 for detecting idle discharge position detects the standard position of the idle discharge operation that the printing heads 2a, 2b, 2c, and 2d perform while traveling in the main scanning direction.

Figure 19:
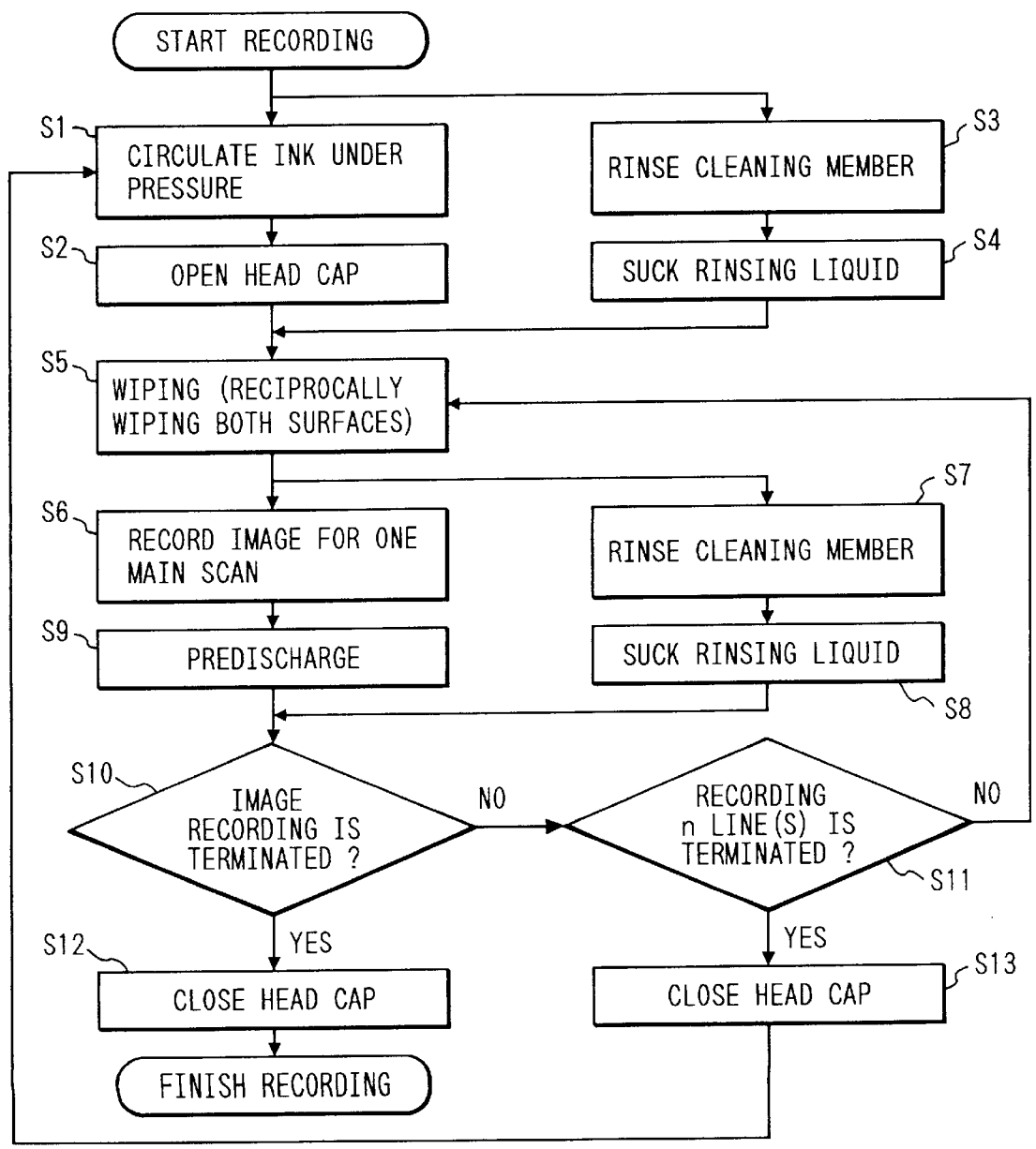
FIG. 19 is a flowchart which shows the example of a printing sequence.

FIG. 19 is a flowchart showing the operational sequence of the technique on the assumption of which the structure described above is arranged in accordance with the present invention. At first, on standby, each of the discharge surfaces 22a, 22b, 22c, and 22d of the printing heads 2a, 2b, 2c, and 2d is capped by capping means 20. When printing signals are received by the control circuit 16, a pressurized ink circulation starts (step S1). Then the head caps are released (step S2).

A recovery by means of the pressurized ink circulation and rinsing by means of the cleaning member 70 are performed simultaneously (step S3).

Then, in step S4, the rinsing solution is sucked, thus reducing the remaining amount of rinsing solution in the cleaning member 70 appropriately. As a result, the capability of absorbing and collecting ink and foreign particles is enhanced to increase the cleaning effects provided by the cleaning member 70. Also, to suck rinsing solution, it is possible to create the negative pressure in the porous element serving as the cleaning member 70 by the application of capillary phenomenon. By making this negative pressure greater than that in the nozzles of the liquid discharge heads, ink is drawn out from each of the nozzles at the time of cleaning. Therefore, it is possible to prevent the rinsing solution from entering the liquid chamber. Further, the capability of ink absorption is created in the interior of the nozzles, hence making it possible to demonstrate a dual effect that overly viscous ink is removed in the nozzles at the same time.

Then, from the motor driver 23, driving signals are transmitted. The driving force of the driving motor 5 is transmitted to the carriage 1 through the belt 4, thus the carriage 1 is being driven to cause the heads to reciprocate. Then, when the carriage 1 passes cleaning means 50, the cleaning member 70 wipes the discharge surfaces 22 one after another for cleaning (step S5). In this respect, the wiping is meant in the present embodiment to define wiping and cleaning the rinsing solution, ink, foreign particles, and the like on each discharge surface.

Now, ink droplets are being discharged while the discharge heads travel from the printing start detection position $P_0$ detected by the printing start detecting sensor 34 in the direction indicated by an arrow D, thus performing an image printing on the print width portion P on a printing sheet 6 (step S6).

At the same time, the cleaning member is rinsed (step S7), and then, the rinsing solution is sucked (step S8) to recover the cleaning capability of the cleaning member. After that, the carriage 1 is reversed, and driven in the direction indicated by an arrow E to perform a predischarging operation while passing the predischarging position (step S9). Here, the predischarge is executed for the liquid receiving member 32. The printing sheet 6 is then fed by the width P of the print portion in the direction indicated by an arrow F (see FIG. 14).

Subsequently, when the image printing continues (that is, a case where step S10 is found to be negative) and n line printing has not been terminated (that is, a case where step S11 is found to be negative), the process will return to the step S5 to cause the carriage 1 to reciprocate, and then, as shown in FIG. 17, a cleaning is executed by reciprocation (step S5). At this juncture, in the forward operation, the wiping surface of the cleaning member 70 is wiped. Therefore, the wiping surface that is once stained does not wipe the discharge surface 22. This arrangement produces no adverse effect on cleaning, rather it enhances the cleaning effect as much as two times.

On the other hand, when the image printing is terminated (that is, the step S10 is found to be affirmative) or the n line printing is terminated (that is, the step S11 is found to be affirmative), the discharge surface 22 of the heads 2 is capped by capping means 20 to be airtightly closed (steps S12 and S13).

(First Embodiment)

Hereinafter, the description will be made of a first embodiment in accordance with the present invention.

Figure 1A:
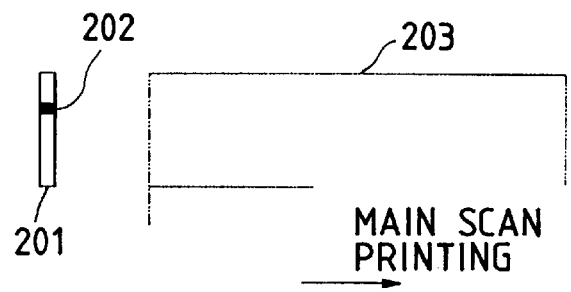
FIGS. 1A to 1G are views which illustrate a complementary recording in accordance with the present invention.

FIGS. 1A to 1G are views which show the features of the present invention. At first, as shown in FIG. 1A, detection is made preceding a printing to determine whether or not any abnormal nozzle exists in the printing head 1 provided with multinozzles formed by a plurality of nozzle arrangements. An abnormal nozzle means the nozzle whose discharge is disabled, the so-called "twisted nozzle", the nozzle that prints dots in an excessively large or small size, or the like. Hereinafter, it is collectively called "non-discharge nozzle."

In FIG. 1A, the non-discharge nozzle or nozzle group is designated by a reference numeral 202 in the nozzle group of the printing head 201. Also, a reference numeral 203 in FIG. 1A designates the area to be printed by the printing head 201.

Figure 1B:
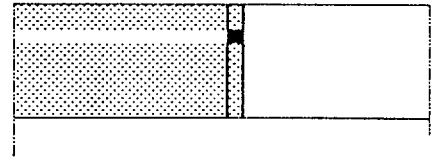
Figure 1C:
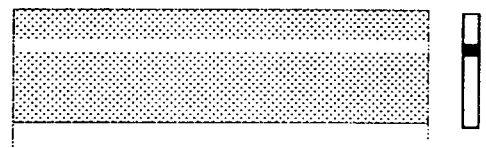

Now, as shown in FIG. 1B, image data is removed with respect to a non-discharge nozzle (per nozzle) or non-discharge nozzle group 202, which is detected by the detection process described above, and then, that particular line is printed. As the result of printing, the portion of the scanned image, which corresponds to the non-discharge nozzle or nozzle group, appears as a white streak as shown in FIG. 1C.

Figure 1D:
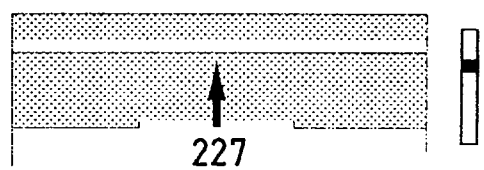

Then, as shown in FIG. 1D, a sub-scanning feed is executed in the sub-scanning direction 227 by the width of the white streak, that is, a width corresponding to the non-discharge nozzle (or non-discharge nozzle group) 202, thus allowing a nozzle (or group) in a good discharging condition to face the white streak portion. The amount of the sub-scanning feed is not necessarily confined thereto. It should be good enough if only the head is arranged to face a position where it can record with a good nozzle (or group) with respect to the area that has not been recorded by the last main scan.

Figure 1E:
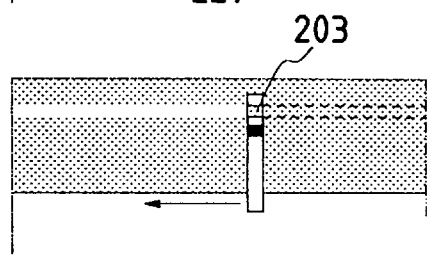
Figure 1F:
Figure 1G:
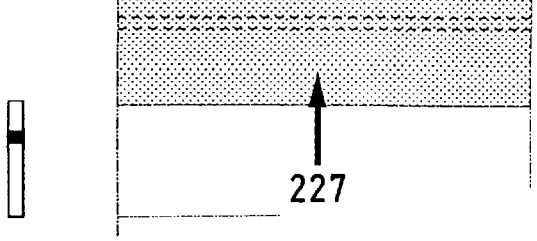

Then, as shown in FIG. 1E, at the time of returning scan of the recording head, the white streak portion is printed complementarily by use of a good nozzle or nozzle group with respect to the part of image data that has not been printed by the last main scan. Consequently, as shown in FIG. 1F, an image is formed without any defects. Thereafter, as shown in FIG. 1G, the sub-scanning feed is executed so that recording is made in the next recording area. Then the aforesaid operation will be repeated.

As described above, in the main scan, a recording is performed by good nozzles excluding non-discharge nozzles, and then, a sub-scanning feed is executed so that the area that has not been recorded can be recorded by use of good nozzles. Subsequently, a complementary recording is executed in the returning scan of the recording head. In this way, it is possible to obtain an image without defects even by the recording head having some abnormal nozzles such as those causing non-discharge.

Also, there is no need for providing any special head for use of complementary recording, nor is there any possibility that the structure of the recording apparatus itself is made more complicated. Further, it is possible to obtain a good image without reducing the recording speed just be executing a sub-scanning feed for a slight amount preceding the returning operation of the recording head.

(Second Embodiment)

Now, a second embodiment will be described in accordance with the present invention.

Figure 2A:
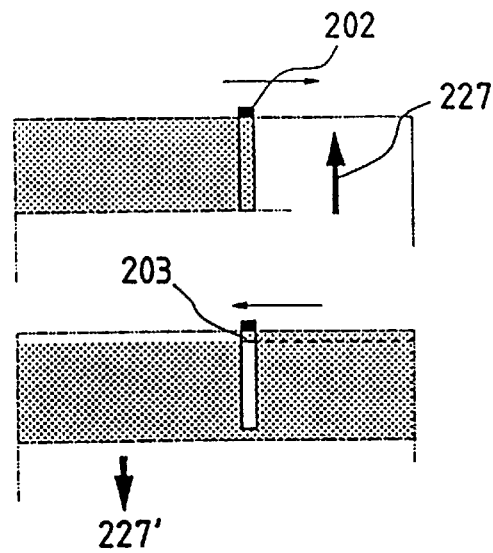
FIGS. 2A and 2B are views which illustrate the structure of another structure of a complementary recording in accordance with the present invention.
Figure 2B:
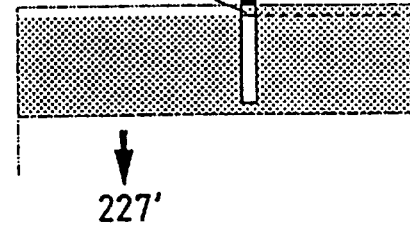

FIGS. 2A and 2B show cases where a non-discharge nozzle (or non-discharge nozzle group) occurs on the end portion of the downstream side in the sub-scanning direction among a plurality of nozzles of a recording head.

When a non-discharge nozzle or group occurs on the end portion of the downstream side like this, it is possible to obtain an image without defects as shown in FIG. 2A by printing the width of one line in the main scan without using the abnormal nozzles after making the printing width narrower to the extent of the area corresponding to the non-discharge nozzles. Then, in order to print on the area that has not been printed due to the occurrence of the non-discharge nozzle or group, a sub-scanning feed is performed in the direction 227' opposite to the sub-scanning feed direction 227 as shown in FIG. 2B, thus enabling a good nozzle or group to face such area. In this way, a complementary printing is performed in the returning operation of the recording head with respect to the area that has not been recorded due to the non-discharge nozzle or group as in the first embodiment.

As described above, in the main scan, a recording is performed by good nozzles 203 excluding non-discharge nozzles, and then, a sub-scanning feed is made executable both in the regular and opposite directions so that the area that has not been recorded can be recorded by use of good nozzles. Subsequently, a complementary recording is executed in the returning scan of the recording head. In this way, it is possible to obtain an image without defects even by the recording head having some abnormal nozzles such as causing non-discharge.

Also, there is no need for providing any special head for use of complementary recording, nor is there any possibility that the structure of the recording apparatus itself is made more complicated. Further, it is possible to obtain a good image without reducing the recording speed just by executing a sub-scanning feed for a slight amount preceding the returning operation of the recording head.

(Third Embodiment)

Figure 3A:
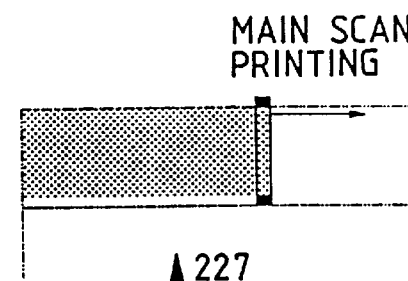
FIGS. 3A and 3B are views which illustrate the structure of another structure of a complementary recording in accordance with the present invention.
Figure 3B:
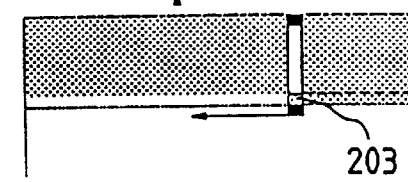

FIGS. 3A and 3B show cases where a non-discharge nozzle (or non-discharge nozzle group) occurs on both ends of a head among a plurality of nozzles of the recording head.

When a non-discharge nozzle or group occurs on both ends of the head like this, a printing is performed by reducing the printing width of only the non-discharge nozzle (or group) on the downstream end in the direction of the sub-scanning feed 227 as shown in FIG. 3A. Then, as shown in FIG. 3B, a complementary printing is performed in the returning scan of the head by use of a good nozzle or group with respect to the margin on the upstream end, which has not been recorded in the main scan.

In the present embodiment, the sub-scanning feed in recording represented in FIG. 3B is performed in the regular direction 227. However, as described in the second embodiment, it may be possible to execute the sub-scanning feed in the opposite direction 227' so that the recording can be performed by good nozzle or group with respect to the area that has not been recorded due to the non-discharge nozzle or group. In consideration of the feed amount in the sub-scanning direction that will be required subsequent to a complementary recording, the sub-scanning feed preceding the returning scan should be performed in the regular direction. Then the sub-scanning amount preceding the main scanning recording is made smaller, thus contributing to the enhancement of the throughput. Also, it may be possible to change the directions of sub-scans preceding the complementary recording in accordance with the number of non-discharge nozzles in a group. Further, by setting the directions of sub-scans alternately preceding the complementary recording, it is possible to make the frequencies of nozzle use uniform for the recording head, thus contributing to the longer life of the recording head.

As described above, it is possible to obtain, as in the previous embodiment, a good image without defects even by the recording head having some abnormal nozzles such as causing non-discharge.

Also, there is no need for providing any special head for use of complementary recording, nor is there any possibility that the structure of the recording apparatus itself is made more complicated. Further, it is possible to obtain a good image without reducing the recording speed just by executing a sub-scanning feed for a slight amount preceding the returning operation of the recording head.

(Fourth Embodiment)

Figure 4A:
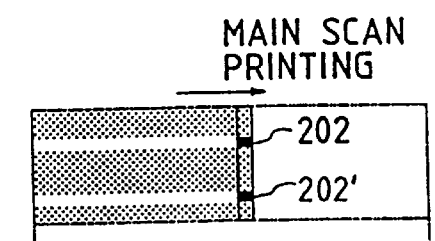
FIGS. 4A and 4B are views which illustrate the structure of another structure of a complementary recording in accordance with the present invention.
Figure 4B:
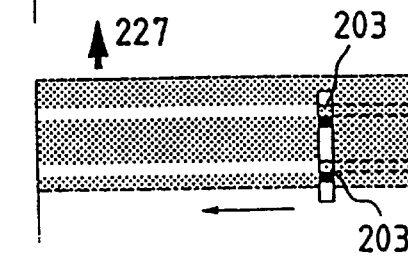

FIGS. 4A and 4B show cases where plural numbers of non-discharge nozzles (or non-discharge nozzle groups) 202 and 202' occur for a head among a plurality of nozzles of the recording head.

When plural non-discharge nozzles (or groups) occur, a recording is performed excluding non-discharge nozzles (or groups) as shown in FIG. 4A in the same way as described in the previous embodiment. Then, as shown in FIG. 4B, a sub-scanning feed is executed so that the areas that have not been recorded but appear as white streaks can be recorded by good nozzles 203 and 203', thus executing a complementary recording in order to obtain a good image without defects.

In some cases, however, there occurs difficulty in obtaining a perfect image having no defects just by the complementary recording as in the previous embodiment.

Figure 5:
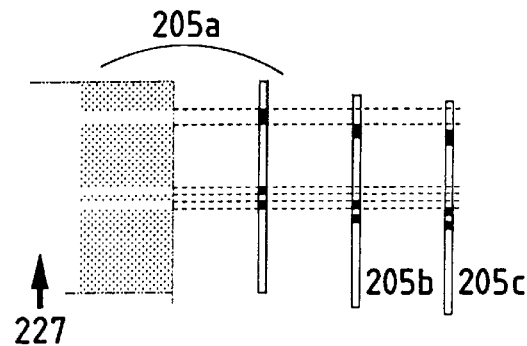
FIG. 5 is a view which illustrates the structure of another structure of a complementary recording in accordance with the present invention.

FIG. 5 shows a state where non-discharges take place with respect to plural nozzles (or nozzle groups) among a plurality of nozzles of a recording head. In FIG. 5, the positions of nozzles (or nozzle groups) presenting malfunction such as non-discharge are particularly complicated. In FIG. 5, a reference numeral 205a designates the relative position between a recording head and recording medium when performing a main scanning recording; also, 205b, the relative position of the recording head when a sub-scanning feed is executed for the maximum width portion of white streaks appearing due to non-recording caused by the non-discharge nozzles (or groups). As shown in FIG. 5, when non-discharge nozzles (or groups) occur, it could be difficult to perform the complementary recording perfectly just by the sub-scanning feed for the maximum width of non-discharge nozzles in some cases. In that case, a sub-scanning feed is further executed in the relative position such as indicated at 205b with respect to the portion that overlaps with the non-recordable area resulting from the occurrence of the non-discharge nozzles. Then, by shifting the recording head to a relative position such as indicated at 205c, it becomes possible to obtain an image without defects. Even if plural non-discharge nozzles (or non-discharge nozzle groups) occur as described above, it is possible to obtain a good image without defects by executing the sub-scanning feed to the position where a complementary recording is possible on the white streaks by use of the good nozzles of the recording head subsequent to the main scanning recording.

Figure 6:
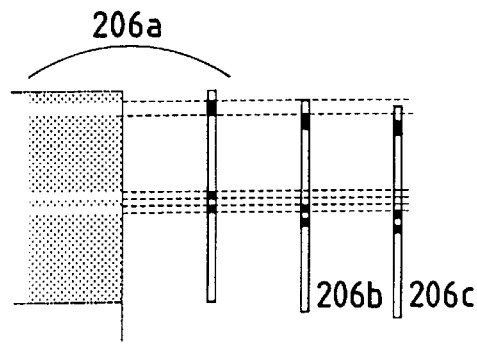
FIG. 6 is a view which illustrates a recording made by a recording head whose nozzles have generated non-discharging.

FIG. 6 shows a case that non-discharge nozzles of a recording head occur in a position where it is made more difficult to execute the complementary recording than in FIG. 5.

As in the example shown in FIG. 5, a sub-scanning feed is executed for the maximum width portion of the white streaks caused by non-discharge nozzles (or groups). Then, assuming that the relative position is now made such as indicated at 206b, there still exists the area where non-recordable portions are overlapped because of the non-discharge nozzles. Consequently, another sub-scanning feed is assumed to have been executed for an amount so that the relative position becomes as indicated at 206c. Then, it appears that the area of the white streak on the downstream end is left unrecorded. In this case, it is determined that no complementary recording is possible for the non-discharge nozzles thus generated, and a warning is issued accordingly. Thus the operation of the apparatus is suspended.

Also, if it is difficult to suspend the operation of the apparatus immediately while in recording or the like, an arrangement may be made so that the complementary recording is executed by plural scans with respect to the area that has not been recorded because of the plural nozzles causing non-discharge. In this case, although the recording speed is lowered inevitably, it is possible to obtain a good and sound image without suspending the operation of the apparatus.

(Fifth Embodiment)

Figure 7:
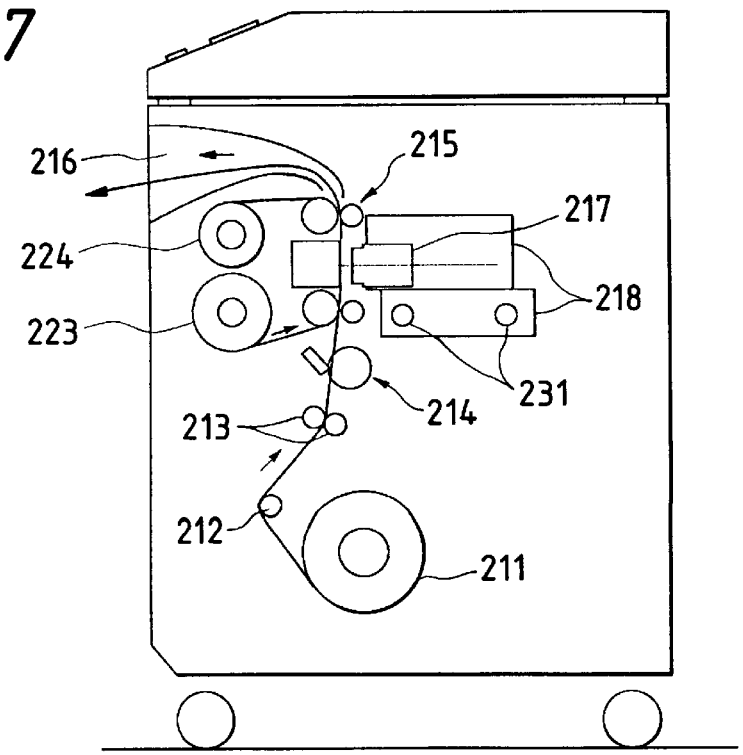
FIG. 7 is a cross-sectional view schematically showing a printing apparatus to which the present invention is applicable.
Figure 8:
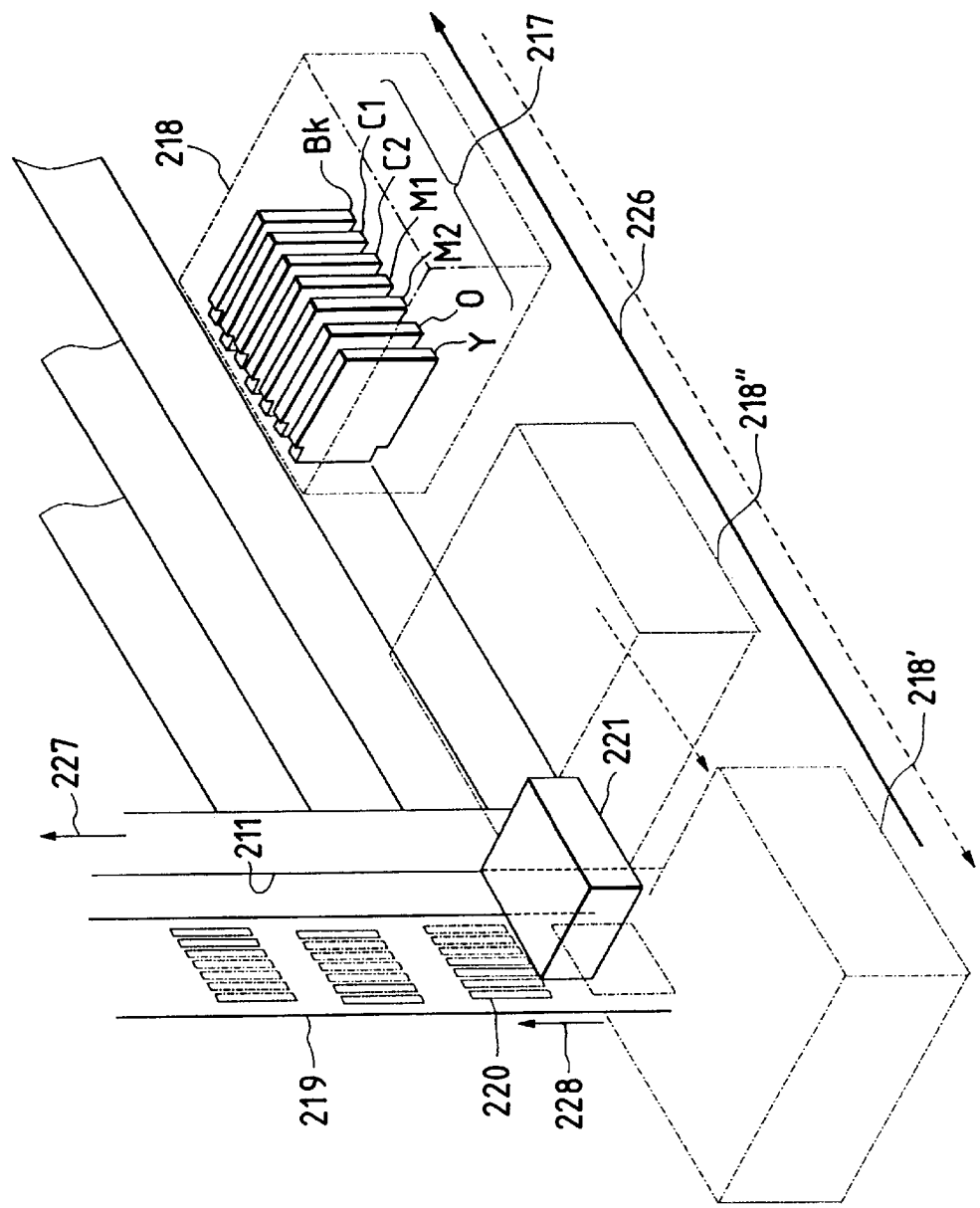
FIG. 8 is a perspective view which shows the printing unit of a printing apparatus to which the present invention is applicable.

FIG. 7 is a view which schematically shows a direct printing apparatus to which the present invention is applicable. Also, FIG. 8 is a perspective view schematically showing its printing unit.

Hereinafter, with reference to FIGS. 7 and 8, the detailed description will be made of a recording apparatus applicable to each of the embodiments described above, an apparatus for detecting non-discharge nozzles, and the control of the non-discharge detection to the execution of the complementary recording with respect to the non-discharge nozzles thus detected.

The rolled ink jet recording sheet 211 set in the lower part of the apparatus main body shown in FIG. 7 is carried to a printing unit 215 by a guide roller 212 and a feed roller 213 through a cutter 214, which cuts the sheet in an appropriate length. The recording sheet is exhausted to the outside from the exhaust sheet port 216 after being printed by means of the printing unit 215.

Now, in conjunction with FIG. 8, the printing unit 215 will be described in detail.

A printing head array 217 comprises a plurality of heads to print in plural colors. The color printing heads comprise seven heads, Bk for printing in black, C1 in cyan, C2 in cyanic special color, M1 in magenta, M2 in magenta special color, O in orange special color, and Y in yellow each. Here, special colors mean those colors that cannot be obtained easily by mixing the conventional four colors (Bk, Y, M, and C). With these special colors, it is possible to clearly reproduce colors hardly obtainable by mixing colors on an image to be recorded, and to provide a wider range for colors to be reproduced at the same time. This head array 217 is mounted integrally with the scanning carriage 218 linearly guided by rails 231.

The head array 217 travels forwardly (main scan) in the direction indicated by an arrow 226 (main scanning direction) in FIG. 8 while printing from the left end to the right, and then, returns to the left side. When one line is printed, the printing sheet 211 is fed (sub-scanned) in the direction indicated by an arrow 227 (in the sub-scanning direction) by the printing width for the execution of printing on the next line.

Figure 9:
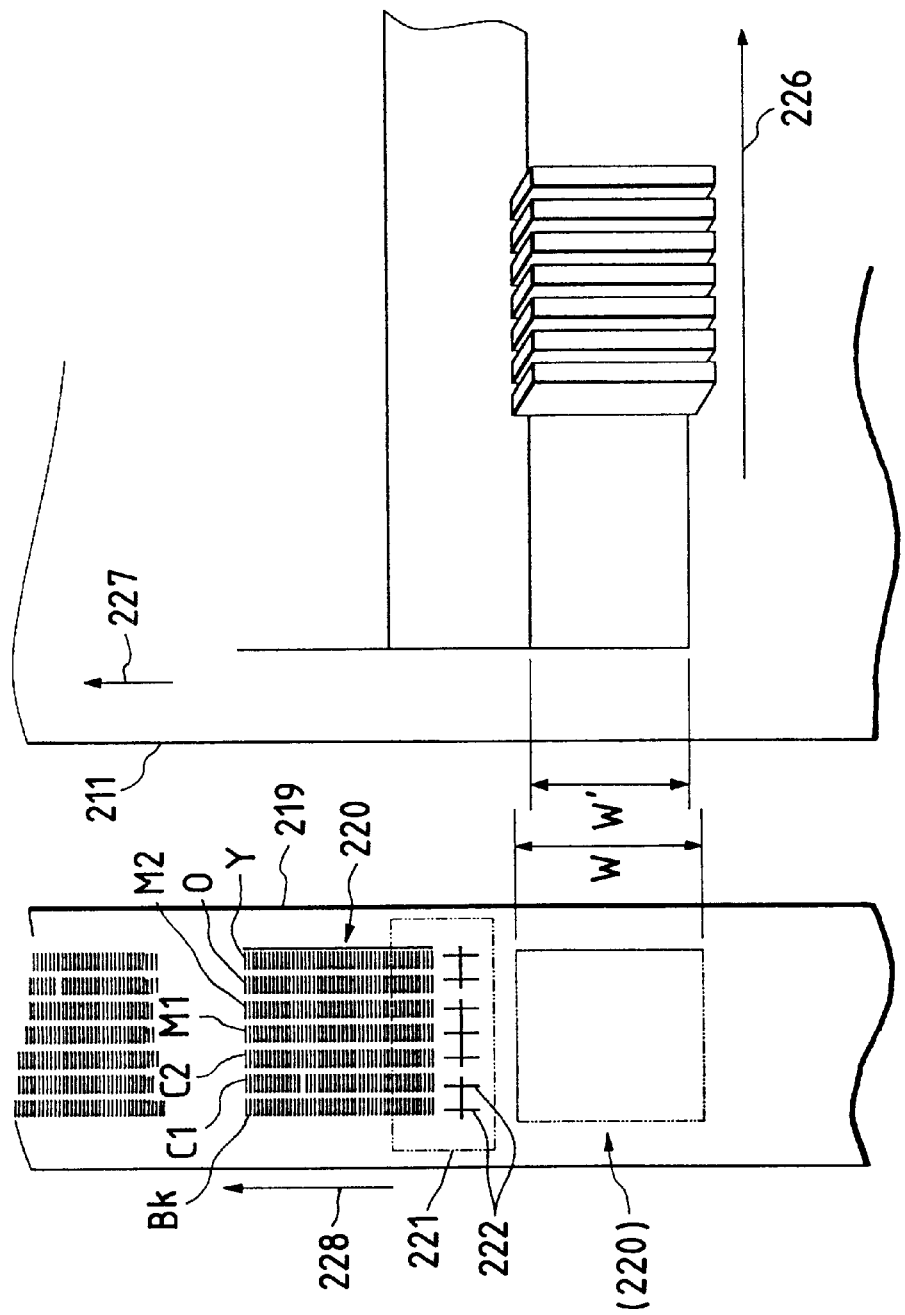
FIG. 9 is a view which illustrates a structure whereby to detect abnormal nozzles.

In FIGS. 8 and 9, a reference numeral 219 designates a sheet for detecting malfunction to confirm and detect the generation of non-discharge nozzles. Its feed driving is arranged separately from that of the printing sheet 211. The pattern 220 for detecting malfunction is such that each color is printed in a density of almost 100% duty to make it easy to detect any malfunction, and is arranged to be transferred intermittently for the detection of malfunction as described later. The sheet 219 for detecting malfunction is supplied from a feeding roller 223 to a winding roller 224 shown in FIG. 7.

As shown in FIG. 9, the printing sheet 211 is fed in the sub-scanning direction (indicated by an arrow 227) precisely at a pitch of the printing width w' so that the printing of each line is continuously performed.

As an apparatus for detecting abnormal nozzles to detect non-discharge nozzles, it is possible to adopt the one disclosed in detail by the applicant hereof in Japanese Patent Laid-Open Application No. 6-79956.

The apparatus for detecting abnormal nozzles disclosed in Japanese Patent Laid-Open Application No. 6-79956 demonstrates a sufficient ability as an apparatus for detecting non-discharge nozzles. In accordance with this apparatus, each individual dot is detected to determine the non-discharge, the twisted discharge, and the discharge of excessively large or small dots of each nozzle. Therefore, even when there are many nozzles that malfunction, it is possible to maintain the complementary function for a long time because, with this detection, the overlapping probability between the white streak portion caused by non-recording in the main scan and the abnormal nozzles becomes smaller when executing the complementary recording.

Here, in the present invention, it is possible to provide a method of detecting abnormal nozzles with a simpler structure. Now, in conjunction with FIGS. 8, 9 and 10, its detail will be described.

Figure 10:
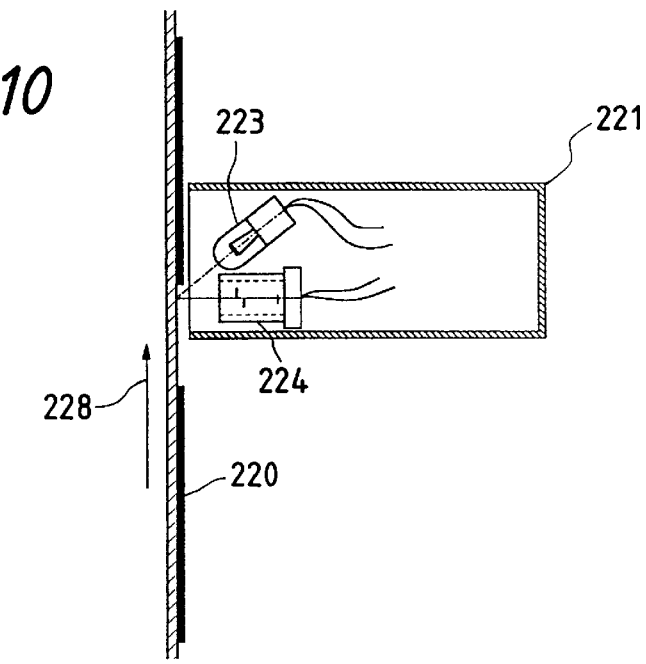
FIG. 10 is a view which illustrates the structure of the sensor of an abnormal nozzle detector.

An apparatus 221 for detecting abnormal nozzles is positioned to face the detection sheet 219. In order to read the detection patterns in the respective colors (the patterns recorded by the recording heads Bk, C1, M1, and others as shown in FIG. 9), its reading center 222 is positioned on the moving line of patterns in each color. Each of the reading devices comprises a pair of lamp 223 and optical sensor 224 as shown in FIG. 10. Also, its width in the vertical direction is made narrower so as to detect non-discharge nozzles, while the structure is arranged to enable the width in the main scanning direction to perform a wider reading in order to average the dot variation from the same nozzle. In this respect, the width in the vertical direction is not necessarily arranged so narrow as to discriminate recording per individual nozzle.

As described above, the detection pattern passes the front end of the fixed reading device 221 in the direction indicated by an arrow 228 as shown in FIG. 9 and FIG. 10 to allow its density to be read for the detection of abnormal nozzles.

Figure 11:
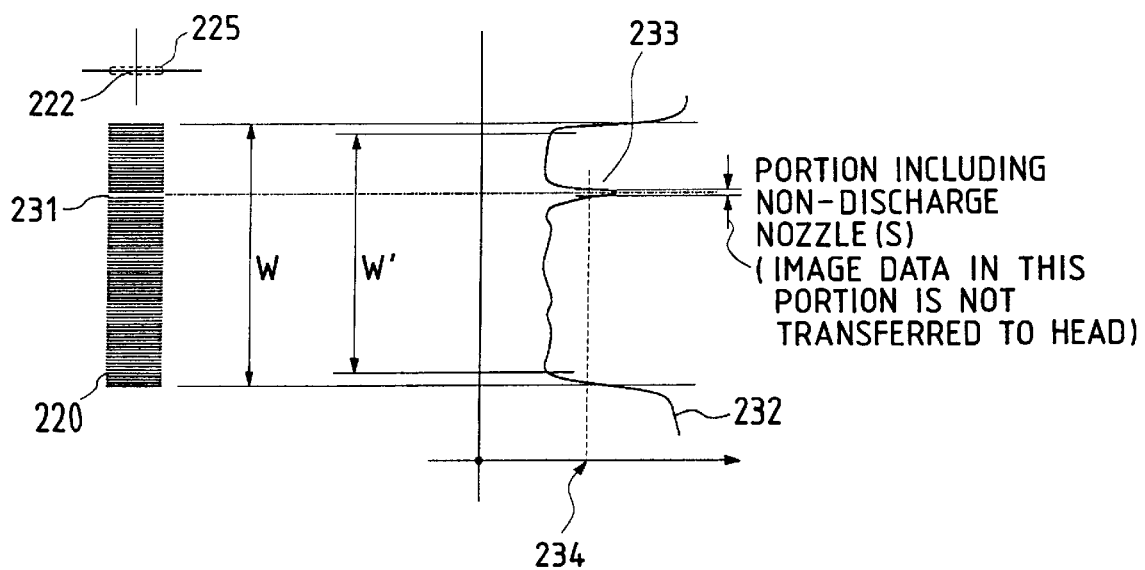
FIG. 11 is a view which shows the output of read out pattern for use of the abnormal nozzle detection.

FIG. 11 shows the output of a reading by the optical sensor, in which a reference numeral 231 designates the nozzle or nozzles that generate non-discharging. As compared to the reading area 225, the non-discharge portion 231 is minute, but in its output 232, the corresponding portion 233 appears. In order to determine any non-discharges, a certain level 234 is defined. The portion whose output is greater than such level in reading (the reflected light from the detection pattern is intensified) is assumed to be an area where non-discharge nozzle group exists. Although it is difficult to detect a nozzle (a single nozzle) that actually generates non-discharge from the result of this reading for detection, it is still possible to adopt this detection for executing a complementary recording by accepting it as a finding that a non-discharge nozzle or nozzles are included in a portion of several nozzles before and after such a minute area thus read out for detection. Also, it is possible to detect the nozzle or nozzles that actually generate non-discharge by use of a sensor capable of providing a highly precise result of detection.

The detection pattern is printed by all of the nozzles (in a width W), but the width of one line to be actually printed is a portion (whose width is W') where the corresponding output of nozzles, which are positioned on both ends of the nozzle array is in the so-called "drooping shoulder" area, is excluded. However, it is still possible to be able to detect any non-discharge that may occur on the ends of this width W' of the actual printing. Here, although the exact detection cannot be carried out with respect to several nozzles on both ends, it is possible to materialize an apparatus for detecting non-discharges extremely easily. Moreover, the non-discharge nozzles can be specified immediately just by a one-time scan of an optical sensor. Therefore, it is possible to shorten the time required to carry out reading to detect the occurrence of non-discharges, and then remove the corresponding data, hence preventing the dropdown of printing speed or the like for the provision of an apparatus whose cost performance is excellent.

Also, in the structure of the apparatus for detecting abnormal nozzles described above, it is also possible to detect non-discharge nozzles on the end portions of the nozzle array of the recording head by combining the recording and sub-scans to form detection patterns in succession in the sub-scanning direction, and by detecting each junction between them arranged in such a way.

Figure 12B:
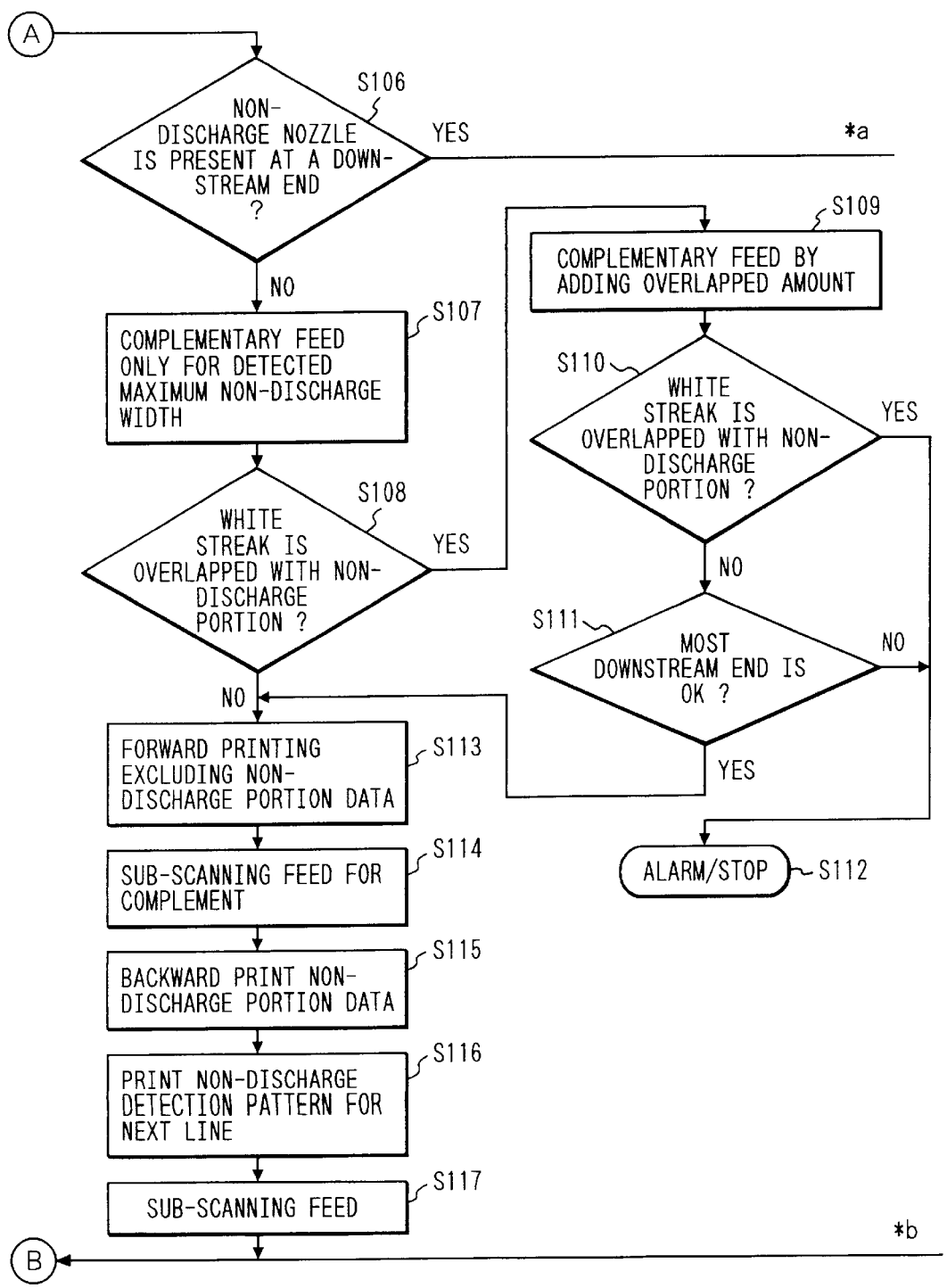
FIG. 12 is comprised of FIGS. 12A and 12B showing flowcharts which shows the control of a complementary recording in accordance with the present invention.
Figure 13:
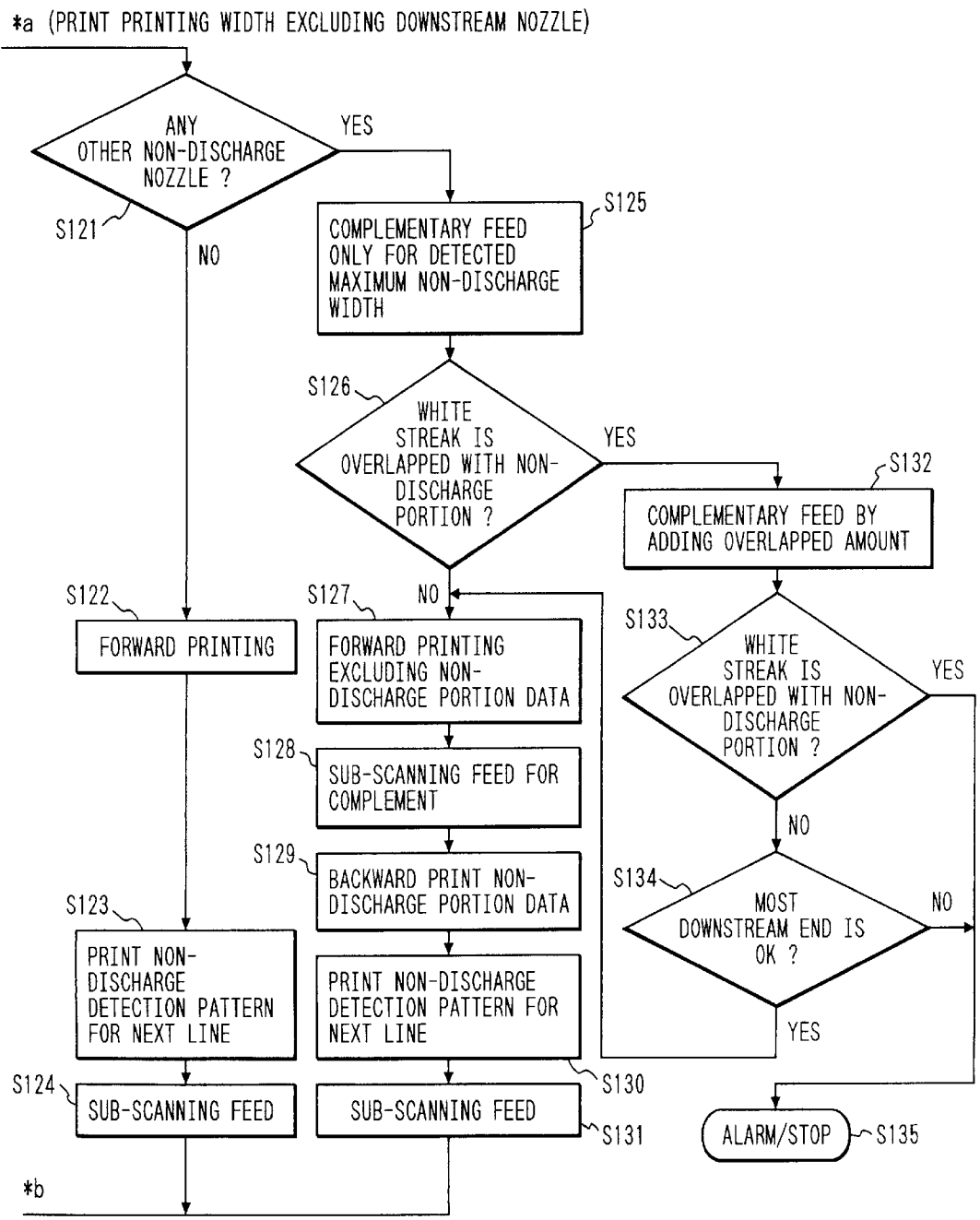
FIG. 13 is a flowchart which shows the control of a complementary recording in accordance with the present invention.

Now, FIGS. 12A, 12B and FIG. 13 are flowcharts showing the control required in this respect.

At first, in step S101, printing is started. Then, in step S102, the detection pattern is printed. In FIG. 8, the carriage advances once from the home position 218' to a position at 218". Then, the detection pattern formed by each color is printed on the detection sheet 219 and the carriage returns to the home position 218'. When the detection pattern is printed, the detection sheet is fed immediately in the direction indicated by an arrow 228. In step S103, the output of the reading is obtained as shown in FIG. 11. Then, in step S104, the position and width of non-discharge nozzles are determined per color from the output of the reading thus obtained. If it is found that there is no nozzle that has generated non-discharge, the process will proceed to step S118 to execute the usual printing. In the step S104, if any non-discharge nozzles are detected, it is determined in the next step S106 whether or not the non-discharge nozzles are positioned on the downstream end of the head. If negative, a sub-scanning feed is executed in the next step S107 for the maximum width of the non-discharge nozzles thus detected. Then, in step S108, it is determined whether or not the white streak recorded in the image by the main scan is overlapped with the non-discharge nozzles when executing the complementary printing in the returning scan. If no overlapping is found in the step S108, the decision is made on the portion in the nozzle array where the printing data is to be removed, as well as the maximum width portion of the detected non-discharge nozzle (or group) to be defined for the amount of sub-scanning feed for the intended complementary printing. Thereafter, the recording in the main scan, sub-scanning feed, and complementary recording in the returning scan are performed in accordance with the conditions thus decided.

After the complementary recording, a sub-scanning feed is performed for an amount, which is arrived at by subtracting the amount of sub-scanning feed preceding the complementary printing from feeding width of the printing sheet for one-line portion, and then, the printing on the next line is prepared. In step S105, it is determined whether or not any printing is to be performed on the next line.

Also, in step S108, if it is found that the white streak portion and the non-discharge nozzles are overlapped, a sub-scanning feed is assumed to be executed for the amount corresponding to such overlapped portion. Then, it is further determined whether or not the white streak that has not been recorded in the last scan overlaps with the non-discharge nozzles. If no overlapping is found, detection is made with respect to the downstream end side of the nozzles. If there is no problem in the relative position currently existing between the recording head and recording area, a sub-scanning feed for the complementary printing is defined accordingly, and thereafter, the printing and complementary printing will be performed as described earlier.

In step S110 or step S111, if it is determined that any complementary process cannot be carried out exactly, a warning is indicated in step S112, and the operation of the apparatus is suspended.

Also, in step S106, if any non-discharge nozzles are detected on the downstream end side of the nozzle array of the recording head, it is assumed as if such nozzles exist, and then, the printing is executed by reducing the printing width of the line to that extent. In step S121 and thereafter, printing and complementary printing are executed in the same manner as described above.

The sub-scanning feed for the complementary recording has been described as being performed in the regular direction in order to determine whether or not the white streak caused by the non-discharge nozzles in the recorded image is overlapped with the area of the non-discharge nozzles in executing the complementary recording. However, it is also possible to perform such sub-scanning feed in the opposite direction, and then, use a method for working out an appropriate amount of the sub-scan, or to combine them for attaining the objective.

In the aforesaid control flow, the description has been made of a head using one color, but in the case of a full color printing apparatus provided with heads using plural colors, the detection patterns for all the colors are examined to determine whether or not the maximum width of a non-discharge nozzles among those having been examined does not present any unfavorable problem with respect to the sub-scanning feed for the complementary operation, and also, to decide on the amount of the sub-scanning feed that may allow the execution of the complementary recording appropriately, thus arranging an appropriate sub-scanning amount for each of the heads preceding the complementary recording.

The structure of detecting abnormal nozzles, which has been described above, is applicable to each of the aforesaid embodiments. Here, using a simply structured detection apparatus, it is possible to appropriately complement the degradation caused by non-discharge nozzles for an image to be recorded.

(Other Embodiments)

In the embodiments described above, the nozzles that cause malfunction such as non-discharge are detected optically using printing patterns. However, the present invention is not necessarily limited thereto. It may be possible to apply a structure in which the breakdown of discharge heaters is detected. The detection of discharge heater breakdown may be possible by conducting resistance checks between the discharge pulses to be applied to printing in accordance with the image data. In this way, it is possible to detect whether or not there is any breakdown of the discharge heaters.

If the heater breakdown detection is used together with the detection method described above, not only is it possible to detect non-discharge nozzles exactly, but also, detect the position where malfunction takes place even when the malfunction occurs while a given line is being printed. Therefore, if only a complementary operation is required accordingly, it is possible to obtain a recorded image without defect by executing an appropriate complementary recording.

Also, in each of the embodiments described above, the complementary recording is performed in the returning operation of the printing head, but it may be possible to arrange the structure so that a main scan is again executed for the complementary recording after the printing head is once returned to its home position side. In this way, the intended complementary recording is completely performed. In this case, although the printing speed is lowered, there is no need for any operation to read out the data reversely in order to make the returning scan in agreement with the forward scan. Moreover, the superposing order of each color at the time of color recording becomes the same as that of the good nozzles. Therefore, the tone of color dots to be recorded by the complementary recording becomes the same as that of other dots, thus making it possible to execute the complementary recording in a better condition for the defective portion caused by non-discharge nozzles. Also, in consideration of the expected slowdown of the printing speed, it may be possible to arrange a structure so that the user can select arbitrarily whether the complementary recording for non-discharge nozzles is executed in the returning operation of the head or the complementary operation is made by performing the main scan again.

In this respect, if an ink jet printing method is adopted for embodying the present invention, it is possible to obtain significant effects. Of the ink jet printing methods, it is possible to demonstrate particularly excellent effects by the application of a method having means for generating thermal energy to be utilized as energy for discharging ink, which is capable of changing the states of ink when the thermal energy is applied. In other words, the adoption of a printing head and apparatus using the bubble jet method proposed by Canon, Inc. contributes to obtaining still better results. With the application of a method of this kind, printing is possible in a higher density and precision.

Regarding the typical structure and operational principle of such method, it is preferable to adopt those which can be implemented using the fundamental principle disclosed in the specification of U.S. Pat. Nos. 4,723,129 and 4,740,796. This method is applicable to the so-called on-demand type printing system and a continuous type printing system as well. Particularly, however, the method is suitable for the on-demand type because the principle is such that at least one driving signal, which provides a rapid temperature rise beyond a departure from nucleation boiling point in response to printing information, is applicable to an electrothermal transducer disposed on a liquid (ink) retaining sheet or liquid passage whereby causing the electrothermal transducer to generate thermal energy to produce film boiling on the thermoactive portion of the printing head, thus effectively leading to the resultant formation of a bubble in the liquid (ink) one to one for each of the driving signals. By the development and contraction of the bubble, the liquid (ink) is discharged through a discharging port to produce at least one droplet. The driving signal is more preferably in the form of pulses because the development and contraction of the bubble can be effectuated instantaneously, and, therefore, the liquid (ink) is discharged with quick response. The driving signal in the form of pulses is preferably such as disclosed in the specification of U.S. Pat. Nos. 4,463,359 and 4,345,262. In this respect, the temperature increasing rate of the heating surface is preferably such as disclosed in the specification of U.S. Pat. No. 4,313,124 for an excellent printing in a better condition.

The structure of the printing head may be as shown in each of the above-mentioned specifications wherein the structure is arranged to combine the discharging ports, liquid passages, and the electrothermal transducers (linear type liquid passages or right-angled liquid passages). Besides, the structure such as disclosed in the specifications of U.S. Pat. Nos. 4,558,333 and 4,459,600 wherein the thermal activation portions are arranged in a curved area is also included in the present invention. In addition, the present invention is effectively applicable to the structure disclosed in Japanese Laid-Open Patent Application No. 59-123670 wherein a common slit is used as the discharging ports for plural electrothermal transducers, and to the structure disclosed in Japanese Patent Laid-Open Application No. 59-138461 wherein an aperture for absorbing the pressure wave of the thermal energy is formed corresponding to the discharge ports.

In addition, it is of course possible to structure the printing head in accordance with the mode of a printing apparatus. With respect to the mode of the so-called line printer, it should be good enough if the printing head is structured so that its discharge ports are arranged over an area corresponding to the width of a printing medium. Also, for the printing head of a serial type as exemplified above, the present invention is effectively applicable to a printing head fixed to the apparatus main body or to an exchangeable chip type, which can be electrically connected with the apparatus main body and ink is supplied from the apparatus main body to the head when it is installed in the apparatus main body, or to the printing head of a cartridge type in which an ink tank is formed together with the printing head itself.

Also, for the present invention, it is preferable to additionally provide a printing head with recovery means and preliminarily auxiliary means as constituents of the printing apparatus because these additional means will contribute to making the effectiveness of the present invention more stabilized. To name them specifically, these are capping means for the printing head, cleaning means, compression or suction means, preliminary heating means using electrothermal transducing elements or heating elements other than these transducing elements or combination of both elements, and predischarge means for executing discharges other than those for printing.

Also, in the embodiments of the present invention described above, while the ink has been described as liquid, it may be an ink material which is solidified below the room temperature but liquefied at the room temperature. Since the ink is controlled within the temperature not lower than 30° C. and not higher than 70° C. to stabilize its viscosity for the provision of the stable discharge in general for an ink jet method, the ink may be such as to be liquefied when the applicable printing signals are given. In addition, it may be possible to adopt the use of ink having a nature of being liquefied only by the application of heat so as to positively prevent the temperature from rising due to the thermal energy by use of such energy as an energy to be consumed for changing states of ink from solid to liquid, or to prevent ink from being evaporated by use of the ink which will be solidified when left intact. In any case, it may be possible to apply to the present invention such ink having a nature to be liquefied only by the application of thermal energy, such as the ink, which is capable of being discharged as ink liquid by enabling itself to be liquefied when the thermal energy is applied in accordance with printing signals, and the ink, which will have already begun solidifying itself by the time it reaches a printing medium. In this case, it may be possible to retain ink in the form of liquid or solid in the recesses or through holes of a porous sheet such as disclosed in Japanese Patent Laid-Open Application No. 54-56847 or No. 60-71260 in order to enable ink to face the electrothermal transducers. In the present invention, the most effective method adoptable for the various kinds of ink mentioned above is the one capable of implementing film boiling as described above.

Further, as the mode of the present invention, it may be possible to adopt a copying apparatus combined with a reader or the like in addition to the image output terminal for a computer, or other information processing apparatus.

Also, it is possible to apply the present invention widely to ink jet textile printing apparatuses for printing fabric by the application of the ink jet recording method. Compared to the conventional screen printing technique, the ink jet textile printing apparatus makes it possible to print fabric at higher speeds in accordance with printing data (such as images, characters, colors, or other information). The features of ink jet recording method are effectively utilized in this respect.

Because of this special usage, that is, to print fabric, the aspect of industrial use should be more intensified. From this point of view, it is desirable to provide a higher speed, a lower cost, a longer life, and an easier maintenance. Here, by the application of the complementary recording technique of the present invention, it is possible to print images without defects continuously, thus demonstrating excellent effects in attaining higher speed and better cost performance.

In this respect, the following properties are required for fabric to be printable by the application of the ink jet method:

(1) The color of ink should come out in a sufficient density.
(2) The degree of exhaustion of ink should be high.
(3) Ink should dry quickly on the fabric.
(4) Ink should not blur irregularly on the fabric.
(5) The fabric should be easy to be carried in the apparatus.

In order to satisfy these properties, it is possible for the present invention to preprocess the fabric as required. For example, in accordance with Japanese Patent Laid-Open Application No. 62-53492, there is disclosed fabric provided with a layer for receiving ink. Also, in Japanese Patent Publication No. 3-46589, it is proposed to provide the fabric in which reduction preventive agent or alkaline substance is contained. As an example of such preprocess, a treatment is made to enable these textiles to contain a substance selected from among alkaline substance, water soluble polymer, synthetic polymer, water soluble metallic salt, urea, and thiourea.

The alkaline substance is, for example, sodium hydroxide, potassium hydroxide, or other sodium alkaline metals, mono-, di-, tri-ethanol amine or other amine group, sodium carbonate, sodium bicarbonate, or other carbonates, alkaline metallic bicarbonate salt or the like. Further, there can be named organic metallic salt such as calcium acetate, barium acetate, or ammonia and ammonia compound or the like. Also, it is possible to use the trichloro natrium acetate or the like that is transformed into an alkaline substance by the application of steaming and drying heat. Particularly, preference is given to natrium carbonate and natrium bicarbonate as an alkaline substance, which is usable as a dye color of reactive pigment.

As water soluble polymer, there can be named, for example, starch such as corn, wheat, cellulose substances such as carboxymethyl cellulose, methyl cellulose, hydroxyethyl cellulose, polysaccharide such as natrium alginic acid, arabian, loquasweet bean, tragacanth, guam rubbers, and tamarind seed, protein substances such as gelatin, casein, and water soluble natural polymer such as tannic substance and lignin substance.

Also, as synthetic polymer, there can be named, for example, polyvinyl alcoholic compound, polyethylene oxide compound, alkali acid water soluble polymer, maleic anhydride water soluble polymer or the like. Of these substances, it is preferable to use poly-saccharide polymer or cellulose polymer.

As water soluble metallic salt, there can be named, for example, alkali metals or a compound of pH 4 to 10, which forms typical ionic crystals, such as halogenous compound of alkaline earth metals. As typical examples of such compounds, there can be named NaCl, $Na_2SO_4$, KC1 and $CH_3COONa$, or the like. Also, as alkaline earth metals, $CaCl_2$ and $MgCl_2$ or the like. Of these substances, the salt group such as Na, K and Ca are preferable.

Methods are not particularly limited to enabling fabric to contain substance and others by means of a preprocess as described above, but it may be possible to name a usually performed dipping method, a padding method, a coating method, a spraying method, among others.

Further, the textile printing ink, which is applicable to fabric for use of ink jet printing, is such as just adhering to the textiles when applied onto them for printing. Therefore, it is preferable to execute a fixing process so that the color pigments in ink such as dyes should be fixed to the textiles. For a fixing process of the kind, any one of known methods is usable. For example, a steaming method, an HT steaming method, or a thermofixing method can be named. If no alkali treatment is given to them in advance, there can be named an alkali pad steaming method, an alkali blotch steaming method, an alkali shock method, an alkali cold fixing method, among others. Also, for the fixing process, there are those which include a reaction process or do not include it depending on the dyes to be used. Among those which do not include this process, there are some examples in which the dyes are contained in the textures and cannot be removed physically. Also, as ink, it is possible to use any one of them appropriately if only a required pigment is contained. It may also be possible to use the ink containing colors, not necessarily dyes.

Further, in order to remove the dyes yet to be reacted and the substances used in the preprocess, rinsing may be applied in accordance with the conventionally known method after executing the reaction and fixing processes as described above. In this respect, it is preferable to perform the conventional fixing process together when this rinsing treatment is exercised.

The printed articles that have been given the post process described above are cut in a desired size. Each of the pieces thus cut is given processes to make it a final product, such as sewing, bonding, welding, or the like, thus obtaining one piece, dress, necktie, swim suit or other clothing, or bed cover, sofa cover, handkerchief, curtain, or the like. The method for processing fabric to make it clothing or other daily necessities by means of sewing and others is a technique that is conventionally known.

In this respect, as a printing medium, there can be named fabric, wall cloths, embroidery threads, wall papers, paper sheets, OHP films or the like. The fabric includes all the textiles, non woven textiles, and other cloths irrespective of materials, weaving methods, and netting methods.

As described above, in accordance with the present invention, it is possible to obtain the result of discharges (recorded image) without defects as desired even when a malfunction occurs in the recording means of a recording apparatus, particularly when non-discharge or another malfunction occurs in the discharging means of an apparatus for discharging liquid such as an ink jet recording apparatus.

By the application of the present invention, a printing head having abnormal nozzles can be used as a "good" head. For example, even for a multinozzle head having as many nozzles as several hundreds to several thousands, its production yield is increased.

Also, in a case where abnormal nozzles occur while the printing head is in use, a complementary recording is performed by detecting such abnormal nozzles. As a result, it is practically possible to prolong the life of the recording head remarkably.

Moreover, it is possible to use an essentially inexpensive multinozzle head having several hundreds to several thousands of nozzles at costs essentially reduced, and to continuously operate it until its effective life terminates, while attempting the prolongation of the effective long life of the head. Therefore, it is possible to provide the ink jet printing technique with productivity and economy in terms of its industrial application.

Also, in accordance with the present invention, the complementary recording is executed in the returning operation of the recording head. Therefore, it is possible for the recording head to perform complementary operation for the abnormal nozzles without lowering the throughput. Further, there is no need for providing any head dedicated for use of the complementary operation other than the head used for usual printing. As a result, the complementary recording is attained without making the structure of the apparatus more complicated or larger.

What is claimed is:

1. A recording apparatus provided with a recording head having a plurality of recording elements, main scanning means for enabling the recording head to execute a main scan relative to a recording medium, driving means for driving the recording head to form an image on the recording medium while the recording head performs a main scan, and sub-scanning means for enabling the recording head to perform a sub-scan with respect to the recording medium in a direction substantially perpendicular to a scanning direction of the main scan, said recording apparatus comprising:

discriminating means for discriminating abnormal recording elements which are not able to record from among the plurality of recording elements of the recording head;

sub-scanning amount determining means for determining an amount of a sub-scan such that positions of the abnormal recording elements before the sub-scan do not overlap with positions of the abnormal recording elements after the sub-scan; and control means for controlling the recording head to perform a main scan recording during forward movement of the recording head using recording elements other than the abnormal recording elements which are not able to record from among the plurality of recording elements used for recording, controlling the sub-scan by the sub-scanning means subsequent to the forward movement by an amount determined by said sub-scanning amount determining means, means controlling the recording head to perform a complementary recording during a backward movement of the recording head using recording elements corresponding to recording positions at which the abnormal recording elements did not record in a previous main scan recording in a forward direction and, after the backward movement of the recording head, controlling a complementary sub-scan by the sub-scanning means prior to another main scan recording during forward movement of the recording head.

2. A recording apparatus according to claim 1, wherein said control means controls recording by selecting only recording elements in a recordable condition from among the plurality of recording elements during a main scan.

3. A recording apparatus according to claim 1, wherein said control means sets the sub-scan amount by the sub-scanning means in an amount corresponding to a width of the abnormal recording elements continuously positioned among the plurality of recording elements after said main scan for recording.

4. A recording apparatus according to claim 1, further comprising:
  means for detecting a malfunction in order to detect abnormal recording element becoming incapable of recording among the plurality of recording elements.

5. A recording apparatus according to claim 4, wherein the means for detecting a malfunction detects a group of recording elements comprising a plurality of recording elements including abnormal recording elements incapable of recording, and said control means controls recording by selecting recording elements excluding said abnormal recording elements while said recording head performs a main scan.

6. A recording apparatus according to claim 1, wherein at a time of a backward movement of said control means after a the main scan, a reading order is reversed with respect to recording data related to the abnormal recording elements incapable of recording in a main scan.

7. A recording apparatus according to claim 1, wherein the recording head is provided with discharge ports to discharge ink corresponding to the plurality of recording elements, and the recording elements comprise discharging means for discharging ink.

8. A recording apparatus according to claim 7, wherein said discharging means are electrothermal transducing elements to give thermal energy to ink, and cause ink to be discharged by creating a change of state of ink by the application of heat caused by the thermal energy.

9. A recording apparatus according to claim 1, wherein said apparatus uses fabric as the recording medium.

10. A recording apparatus provided with a recording head having a plurality of recording elements, main scanning means for enabling the recording head to execute a main scan relative to a recording medium, driving means for driving the recording head to form an image on the recording medium while the recording head performs a main scan, and sub-scanning means for enabling the recording head to perform a sub-scan with respect to the recording medium in a direction substantially perpendicular to a scanning direction of the main scan, said recording apparatus comprising:
  discriminating means for discriminating abnormal recording elements which are not able to record from among the plurality of recording elements of the recording head;
  sub-scanning amount determining means for determining an amount of a sub-scan such that positions of the abnormal recording elements before the sub-scan do not overlap with positions of the abnormal recording elements after the sub-scan; and
  control means for controlling the recording head to perform a main scan recording during movement of the recording head in a predetermined direction using recording elements other than the abnormal recording elements which are not able to record from among the plurality of recording elements used for recording, and for controlling the sub-scan by the sub-scanning means subsequent to the movement in the predetermined direction by an amount determined by said sub-scanning amount determining means, said control means controlling the recording head to perform a complementary recording in a direction opposite to the predetermined direction by recording elements corresponding to recording positions at which the abnormal recording elements in a previous main scan recording in the predetermined direction did not record, and controlling the sub-scanning means to perform a complementary sub-scan prior to another main scan recording in the predetermined direction after the complementary recording.

11. A recording apparatus according to claim 10, wherein said control means controls recording by selecting only recordable recording elements among said plurality of recording elements while said recording head is in the main scan.

12. A recording apparatus according to claim 10, wherein said control means sets a sub-scan by the sub-scanning means in an amount corresponding to a width of the abnormal recording elements continuously positioned among the plurality of recording elements after a main scan recording.

13. A recording apparatus according to claim 10, further comprising:
  means for detecting a malfunction in order to detect abnormal recording elements becoming incapable of recording among the plurality of recording elements.

14. A recording apparatus according to claim 10, wherein said recording head is provided with discharge ports to discharge ink corresponding to said plurality of recording elements, and said recording elements are discharging means for discharging ink.

15. A recording apparatus according to claim 14, wherein said discharging means are electrothermal transducing elements to give thermal energy to ink, and cause ink to be discharged by creating a change of state of ink by the application of heat caused by the thermal energy.

16. A recording apparatus according to claim 10, wherein said apparatus uses fabric as the recording medium.

17. A recording method for a recording apparatus provided with a recording head having a plurality of recording elements, main scanning means for enabling the recording head to execute a main scan relative to a recording medium, driving means for driving the recording head to form an image on the recording medium while the recording head performs a main scan, and sub-scanning means for enabling the recording head to perform a sub-scan with respect to the recording medium in a direction substantially perpendicular to a scanning direction of the main scan, said method comprising the steps of:
  discriminating abnormal recording elements which are not able to record from among the plurality of recording elements of the recording head;
  determining an amount of a sub-scan such that positions of the abnormal recording elements before the sub-scan do not overlap with positions of the abnormal recording elements after the sub-scan;
  recording during a main scan of the recording head in a predetermined direction by using recording elements other than the abnormal recording elements which are not capable of recording from among the plurality of recording elements used for recording;
  performing a sub-scan by the sub-scanning means subsequent to the movement in the predetermined direction by an amount determined in the determining step;
  causing the main scanning means to scan the recording head in a direction opposite to the predetermined direction;
  performing a complementary recording using recording elements corresponding to recording positions at which the abnormal recording elements did not record in a recording scan in the predetermined direction; and
  performing a complementary sub-scan prior to recording during another main scan in the predetermined direction after the complementary recording.

18. A recording method according to claim 17, wherein the recording head is provided with discharge ports to discharge ink corresponding to the plurality of recording elements, and the recording elements are discharging means for discharging ink.

19. A recording method according to claim 18, wherein the discharging means are electrothermal transducing elements to give thermal energy to ink, and cause ink to be discharged by creating change of state of ink by the application of heat caused by the thermal energy.

20. A recording method according to claim 17, wherein the apparatus uses fabric as its recording medium.

21. A method according to claim 17, wherein in said complementary recording step the complementary recording is performed during a return movement of the recording head from said recording step.

22. A method according to claim 17, wherein in said complementary recording step the complementary recording is performed during a movement of the recording head in a same moving direction as in said recording step.

* * * * *

UNITED STATES PATENT AND TRADEMARK OFFICE
CERTIFICATE OF CORRECTION

PATENT NO. : 6,089,695
DATED : July 18, 2000
INVENTOR(S) : Eiichi Takagi et al.

It is certified that error appears in the above-identified patent and that said Letters Patent is hereby corrected as shown below:

Title page,
Item [57], ABSTRACT,
Line 1, "is to perform" should read -- performs --;
Line 3, "becoming" should be deleted and "recording while record-" should read -- recording. --;
Line 4, "ing and image." should be deleted;
Line 6, "becoming" should be deleted;
Line 7, "the performance of" should be deleted;
Line 10, "¶ Preceding" should read -- Preceding --;
Line 11, "are" should read -- is --; and
Line 20, "a" should be deleted.

Column 6,
Line 24, "shows" should read -- show --.

Column 8,
Line 13, "rising" should read -- rinsing --.

Column 11,
Line 10, "the" (1st occurrence) should read -- a --; and
Line 45, "be" should read -- by --.

Column 22,
Line 19, "a recording head" should read -- a plurality of recording heads --;
Line 21, "head" should read -- heads --;
Line 23, the recording head" should read -- at least one of the recording heads --;
Line 24, "head performs" should read -- heads perform --;
Line 25, "head" should read -- heads --;
Line 29, "discriminating" (second occurrence) should read -- discriminating one or more --
Line 31, "elements of the" should read -- elements for each of the plurality of --;
Line 32, "head;" should read -- heads; --
Line 34, "sub-scan" should read -- sub-scan in accordance with a position of the discriminated one or more abnormal recording elements of the plurality of recording heads --;
Line 39, "head" should read -- heads --;
Line 41, "head" should read -- heads --;
Line 47, "means" (2nd occurrence) should read -- said control means --
Line 48, "head" should read -- heads --;
Line 49, "backward movement" should read -- different scan --
Line 50, "head" should read -- heads --;

UNITED STATES PATENT AND TRADEMARK OFFICE
CERTIFICATE OF CORRECTION

PATENT NO. : 6,089,695
DATED : July 18, 2000
INVENTOR(S) : Eiichi Takagi et al.

It is certified that error appears in the above-identified patent and that said Letters Patent is hereby corrected as shown below:

Column 22,
Line 53, "backward" should read -- different scan --;
Line 54, "movement" should be deleted and "head," should read -- heads, --; and
Line 57, "head." should read -- heads. --.

Column 23,
Line 15, "the" should be deleted;
Line 30, "a recording head" should read -- a plurality of recording heads --;
Line 32, "head" should read -- heads --;
Line 34, "driving the recording head" should read -- driving at least one of the recording heads --;
Line 35, "head performs" should read -- heads perform --;
Line 36, "head to" should read -- heads to --;
Line 40, "abnormal" should read -- one or more abnormal --;
Line 42, "elements of " should read -- elements for each of -- and "recording" should read -- plurality of recording --;
Line 43, "head;" should read -- heads; --;
Line 45, "a sub-scan" should read -- a sub-scan in accordance with a position of the discriminated one or more abnormal recording elements of the plurality of recording heads --;
Line 50, "head" should read -- heads --;
Line 52, "head" should read -- heads --;
Line 55, "and" should be deleted;
Line 56, "for" should be deleted;
Line 60, "head" should read -- heads --;
Line 61, "a direction opposite to the" should read -- different scan using --; and
Line 62, "predetermined direction by" should be deleted.

Column 24,
Line 30, "a recording head" should read -- a plurality of recording heads --;
Line 32, "head" should read -- heads --;
Line 33, "driving the recording head" should read -- driving at least one of the recording heads --;
Line 34, "head" should read -- heads --;
Line 35, "performs" should read -- perform --;
Line 36, "head" should read -- heads --;
Line 40, "discriminating" should read -- discriminating one or more --;
Line 42, "elements of the" should read -- elements for each of the plurality of -- and "head;" should read -- heads; --;
Line 43, "sub-scan" should read -- sub-scan in accordance with a positon of the discriminated one or more abnormal recording elements of the plurality of recording heads --;

UNITED STATES PATENT AND TRADEMARK OFFICE
CERTIFICATE OF CORRECTION

PATENT NO. : 6,089,695
DATED : July 18, 2000
INVENTOR(S) : Eiichi Takagi et al.

It is certified that error appears in the above-identified patent and that said Letters Patent is hereby corrected as shown below:

Line 47, "head" should read -- heads --;
Line 56, "head" should read -- heads -- and "direction opposite to the predetermined" should read -- different scan; --; and
Line 57, "direction;" should be deleted.

Column 26,
Line 9, insert

--      23. A recording apparatus as recited in claim 1, wherein said control means controls the recording heads to record a test pattern on the recording medium outside of a recording area.

23. A recording apparatus as recited in claim 1, wherein said discriminating means discriminates the one or more abnormal recording elements during the sub-scan by the sub-scanning means.

25. A recording apparatus as recited in claim 10, wherein said control means controls the recording heads to record a test pattern on the recording medium outside of a recording area.

26. A recording apparatus as recited in claim 10, wherein said discriminating means discriminates the one or more abnormal recording elements during the sub-scan by the sub-scanning means.

27. A recording method as recited in claim 17, further comprising the step of recording a test pattern on the recording medium outside of a recording area.

UNITED STATES PATENT AND TRADEMARK OFFICE
CERTIFICATE OF CORRECTION

PATENT NO. : 6,089,695
DATED : July 18, 2000
INVENTOR(S) : Eiichi Takagi et al.

It is certified that error appears in the above-identified patent and that said Letters Patent is hereby corrected as shown below:

28. A recording method as recited in claim 17, wherein the one or more abnormal recording elements are discriminated during the sub-scan by the sub-scanning means. --.

Signed and Sealed this

Twenty-fifth Day of December, 2001

*Attest:*

JAMES E. ROGAN
*Director of the United States Patent and Trademark Office*

*Attesting Officer*